US012634916B2

(12) United States Patent
Jiang

(10) Patent No.: US 12,634,916 B2
(45) Date of Patent: May 19, 2026

(54) SEMI-PERSISTENT RESOURCE DETERMINATION METHOD AND APPARATUS, AND COMMUNICATION DEVICE

(71) Applicant: Beijing Xiaomi Mobile Software Co., Ltd., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 284 days.

(21) Appl. No.: 18/278,273

(22) PCT Filed: Feb. 22, 2021

(86) PCT No.: PCT/CN2021/077302
§ 371 (c)(1),
(2) Date: Aug. 22, 2023

(87) PCT Pub. No.: WO2022/174458
PCT Pub. Date: Aug. 25, 2022

(65) Prior Publication Data
US 2024/0137925 A1    Apr. 25, 2024
US 2024/0236971 A9    Jul. 11, 2024

(51) Int. Cl.
*H04W 72/11*        (2023.01)
*H04L 5/00*         (2006.01)

(52) U.S. Cl.
CPC .......... *H04W 72/11* (2023.01); *H04L 5/0094* (2013.01)

(58) Field of Classification Search
CPC . H04W 72/11; H04W 72/04; H04W 72/1278;
H04W 72/20; H04W 28/0215; H04W 28/18; H04W 72/0453; H04W 72/12; H04W 72/1205; H04W 8/24; H04L 5/0094
See application file for complete search history.

(56) References Cited

U.S. PATENT DOCUMENTS

| | | | |
|---|---|---|---|
| 2019/0053159 A1 | 2/2019 | Wei et al. | |
| 2019/0174522 A1* | 6/2019 | Xiao ...................... | H04W 28/18 |
| 2022/0141860 A1* | 5/2022 | Elshafie ................ | H04W 76/36 |
| | | | 455/452.1 |

FOREIGN PATENT DOCUMENTS

| | | |
|---|---|---|
| CN | 107580340 A | 1/2018 |
| CN | 110351018 A | 10/2019 |
| CN | 111148262 A | 5/2020 |
| CN | 111757391 A | 10/2020 |
| CN | 111757521 A | 10/2020 |
| WO | 2018227478 A1 | 12/2018 |

(Continued)

OTHER PUBLICATIONS (U.S. Appl. No. 63/107,428) (Year: 2020).*

(Continued)

*Primary Examiner* — Rushil P. Sampat
(74) *Attorney, Agent, or Firm* — Volpe Koenig

(57) ABSTRACT

Semi-persistent resource determination methods and apparatuses, and communication devices are provided. The solution is: sending an indication message to a user equipment UE, where a specified resource period of the semi-persistent resource for service data included in the indication message is different from default configurable resource periods of the semi-persistent resource.

18 Claims, 7 Drawing Sheets

In response to determining that an arrival time interval of the service data is different from the default configurable resource periods, determine a duration value corresponding to a default configurable resource period less than the arrival time interval of the service data as a millisecond value m corresponding to a first period value included in a specified resource period corresponding to each SCS — 201

Determine a first difference between the arrival time interval of the service data and the m — 202

Determine a number of symbols corresponding to a second period value included in the specified resource period corresponding to each SCS according to the duration per symbol corresponding to each SCS and the first difference — 203

Send an indication message to a user equipment UE, where the indication message includes the specified resource period corresponding to the semi-persistent resource for the service data — 204

(56) References Cited

FOREIGN PATENT DOCUMENTS

WO          2020155149  A1      8/2020

OTHER PUBLICATIONS

ISA State Intellectual Property Office of the People's Republic of China, International Search Report Issued in Application No. PCT/CN2021/077302, Nov. 3, 2021, WIPO, 4 pages.

CMCC, "How to address non-integer multiple of CG-SPS periodicities", 3GPP TSG-RAN WG2 #106, R2-1905913, May 3, 2019, 4 pages.

ZTE,"SPS enhancements for V2V over PC5", 3GPP TSG RAN WG2 #94, R2-163836, May 13, 2016, 3 pages.

European Patent Office, Extended European Search Report Issued in Application No. 219261757, Mar. 12, 2024, Germany, 9 pages.

Huawei, HiSilicon, "Discussion on flexible periodicities for Configured Grant/SPS", R2-1904374, 3GPP TSG-RAN WG2 Meeting 105bisi, Xi'an, China, Apr. 8-12, 2019, 5 pages.

ISA State Intellectual Property Office of the People's Republic of China, Written Opinion of the International Searching Authority Issued in Application No. PCT/CN2021/077302, Nov. 3, 2021, WIPO, 7 pages.

Chinese Office Action issued on Dec. 25, 2025 for Chinese Patent Application No. 202180000527.2.

* cited by examiner

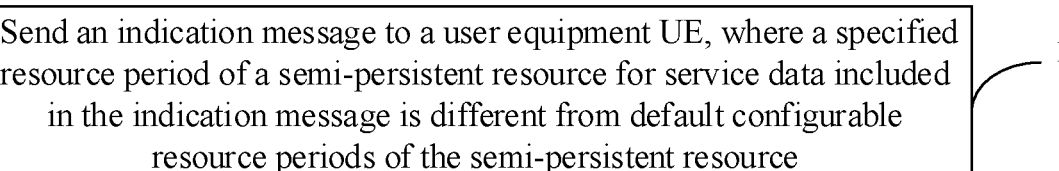

Send an indication message to a user equipment UE, where a specified resource period of a semi-persistent resource for service data included in the indication message is different from default configurable resource periods of the semi-persistent resource ⟋— 101

FIG. 1A

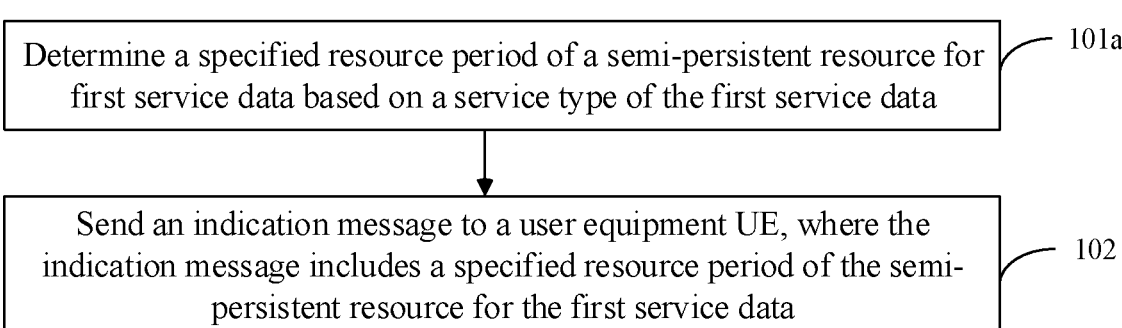

Determine a specified resource period of a semi-persistent resource for first service data based on a service type of the first service data ⟋— 101a Send an indication message to a user equipment UE, where the indication message includes a specified resource period of the semi-persistent resource for the first service data ⟋— 102

FIG. 1B

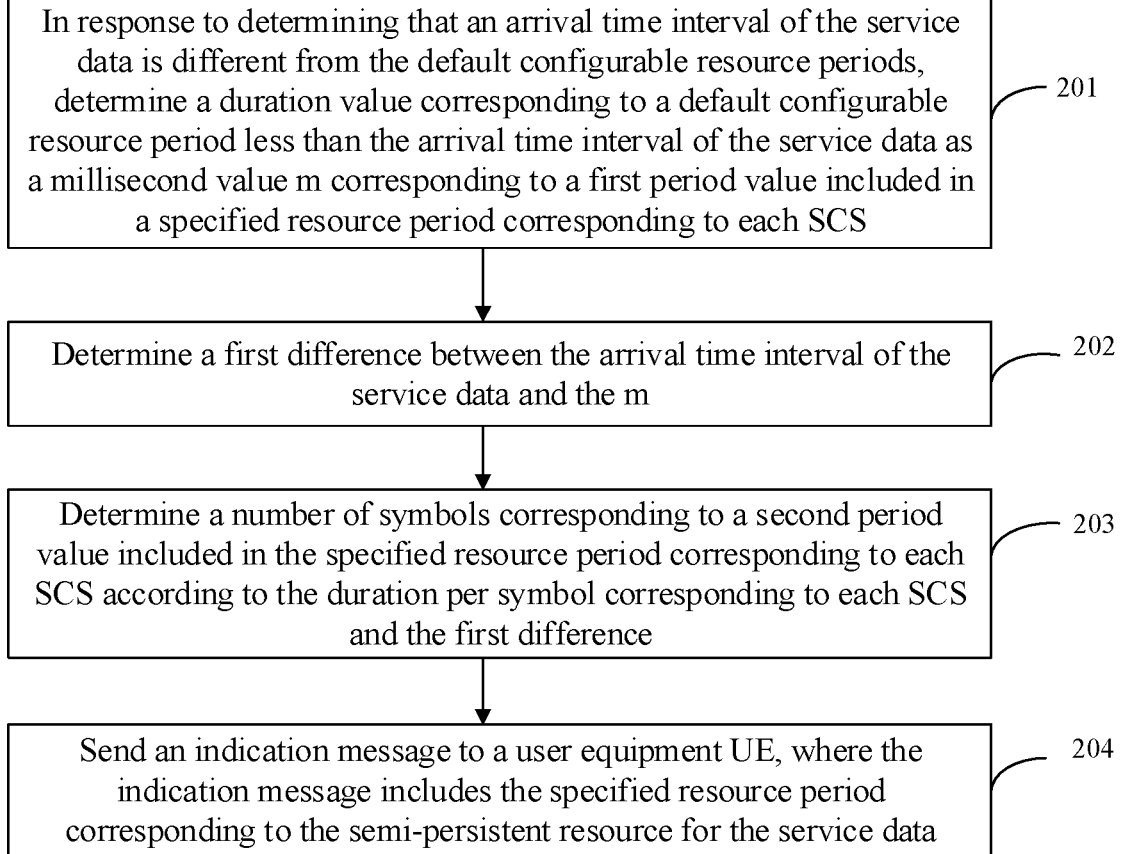

In response to determining that an arrival time interval of the service data is different from the default configurable resource periods, determine a duration value corresponding to a default configurable resource period less than the arrival time interval of the service data as a millisecond value m corresponding to a first period value included in a specified resource period corresponding to each SCS ⟋— 201

Determine a first difference between the arrival time interval of the service data and the m ⟋— 202

Determine a number of symbols corresponding to a second period value included in the specified resource period corresponding to each SCS according to the duration per symbol corresponding to each SCS and the first difference ⟋— 203

Send an indication message to a user equipment UE, where the indication message includes the specified resource period corresponding to the semi-persistent resource for the service data ⟋— 204

FIG. 2

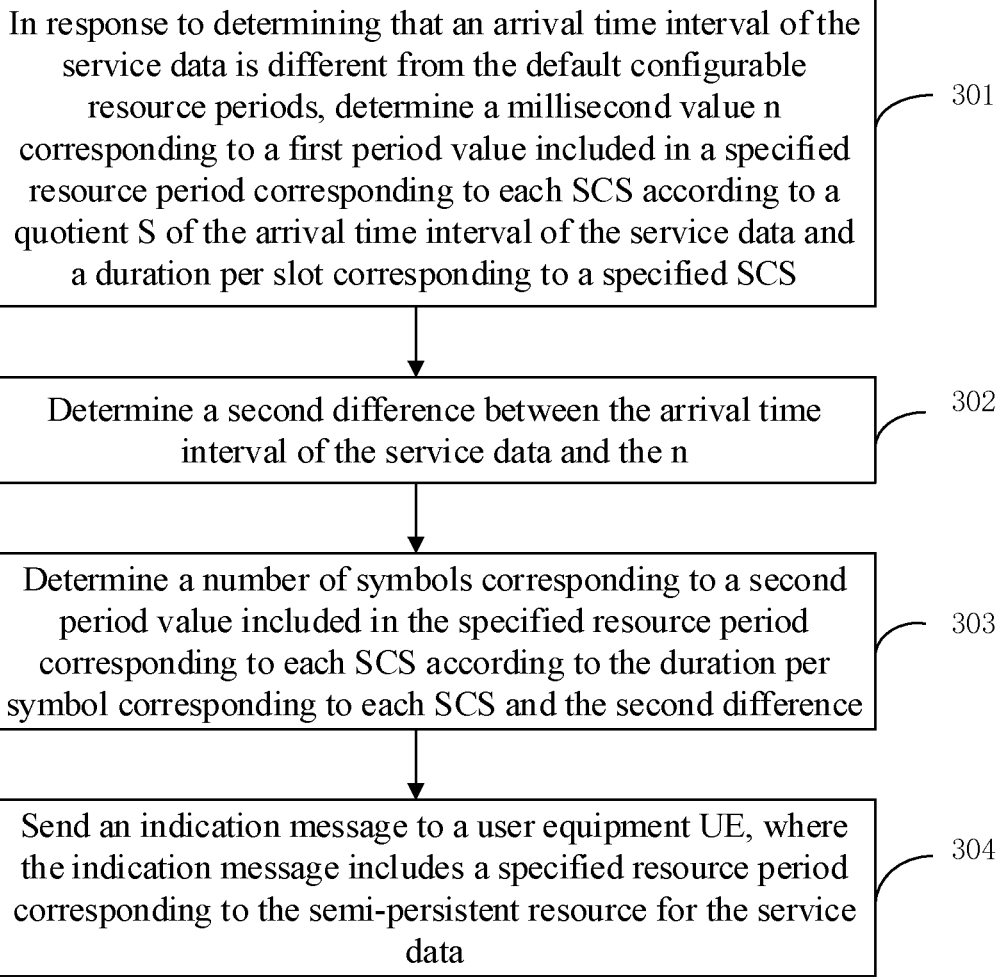

In response to determining that an arrival time interval of the service data is different from the default configurable resource periods, determine a millisecond value n corresponding to a first period value included in a specified resource period corresponding to each SCS according to a quotient S of the arrival time interval of the service data and a duration per slot corresponding to a specified SCS    301

Determine a second difference between the arrival time interval of the service data and the n    302

Determine a number of symbols corresponding to a second period value included in the specified resource period corresponding to each SCS according to the duration per symbol corresponding to each SCS and the second difference    303

Send an indication message to a user equipment UE, where the indication message includes a specified resource period corresponding to the semi-persistent resource for the service data    304

FIG. 3

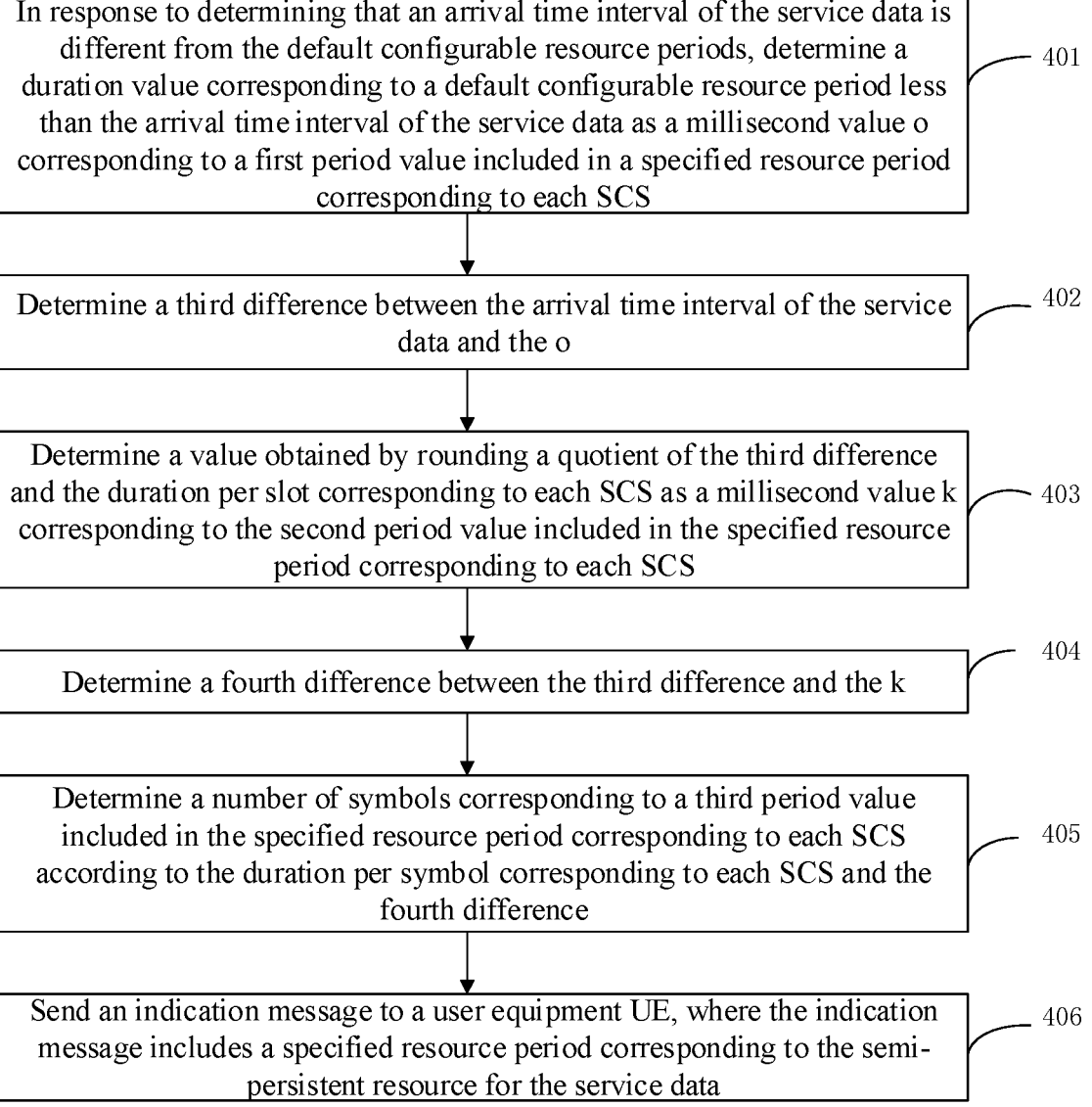

In response to determining that an arrival time interval of the service data is different from the default configurable resource periods, determine a duration value corresponding to a default configurable resource period less than the arrival time interval of the service data as a millisecond value o corresponding to a first period value included in a specified resource period corresponding to each SCS — 401

Determine a third difference between the arrival time interval of the service data and the o — 402

Determine a value obtained by rounding a quotient of the third difference and the duration per slot corresponding to each SCS as a millisecond value k corresponding to the second period value included in the specified resource period corresponding to each SCS — 403

Determine a fourth difference between the third difference and the k — 404

Determine a number of symbols corresponding to a third period value included in the specified resource period corresponding to each SCS according to the duration per symbol corresponding to each SCS and the fourth difference — 405

Send an indication message to a user equipment UE, where the indication message includes a specified resource period corresponding to the semi-persistent resource for the service data — 406

FIG. 4

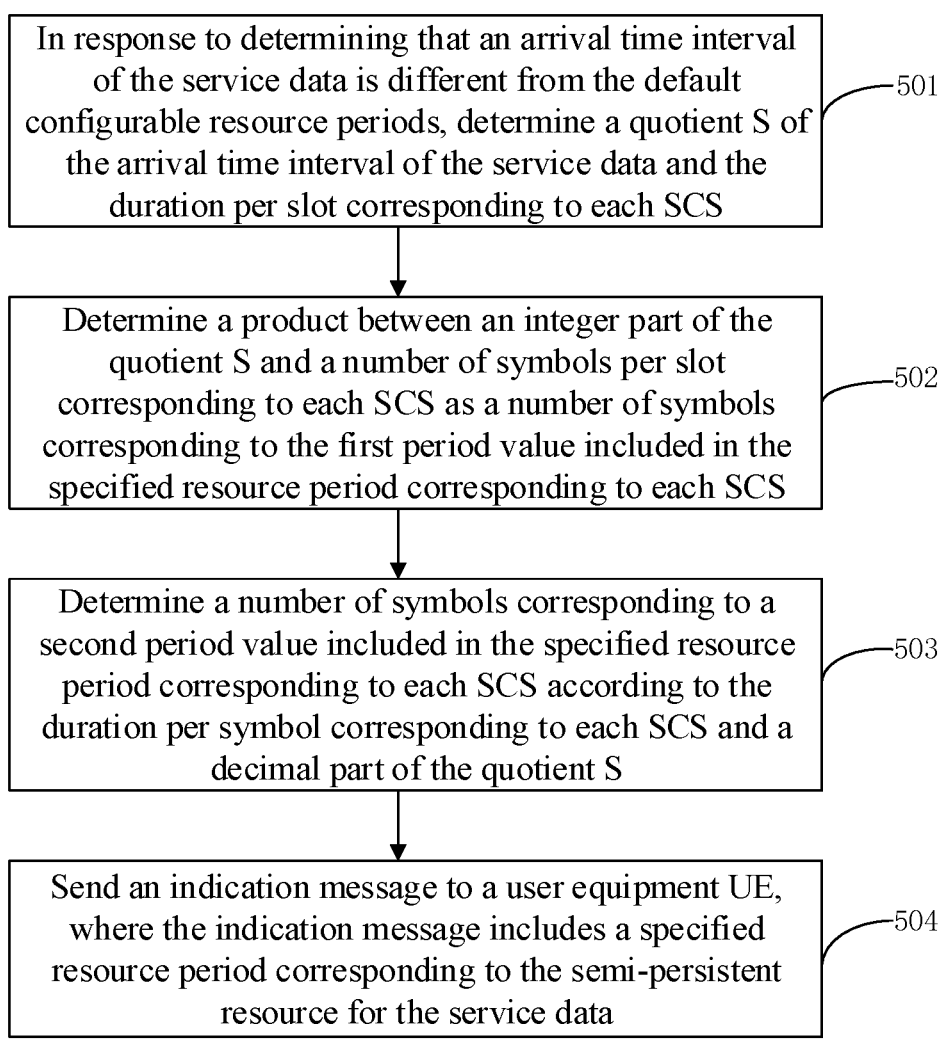

In response to determining that an arrival time interval of the service data is different from the default configurable resource periods, determine a quotient S of the arrival time interval of the service data and the duration per slot corresponding to each SCS ⟋501

Determine a product between an integer part of the quotient S and a number of symbols per slot corresponding to each SCS as a number of symbols corresponding to the first period value included in the specified resource period corresponding to each SCS ⟋502

Determine a number of symbols corresponding to a second period value included in the specified resource period corresponding to each SCS according to the duration per symbol corresponding to each SCS and a decimal part of the quotient S ⟋503

Send an indication message to a user equipment UE, where the indication message includes a specified resource period corresponding to the semi-persistent resource for the service data ⟋504

FIG. 5

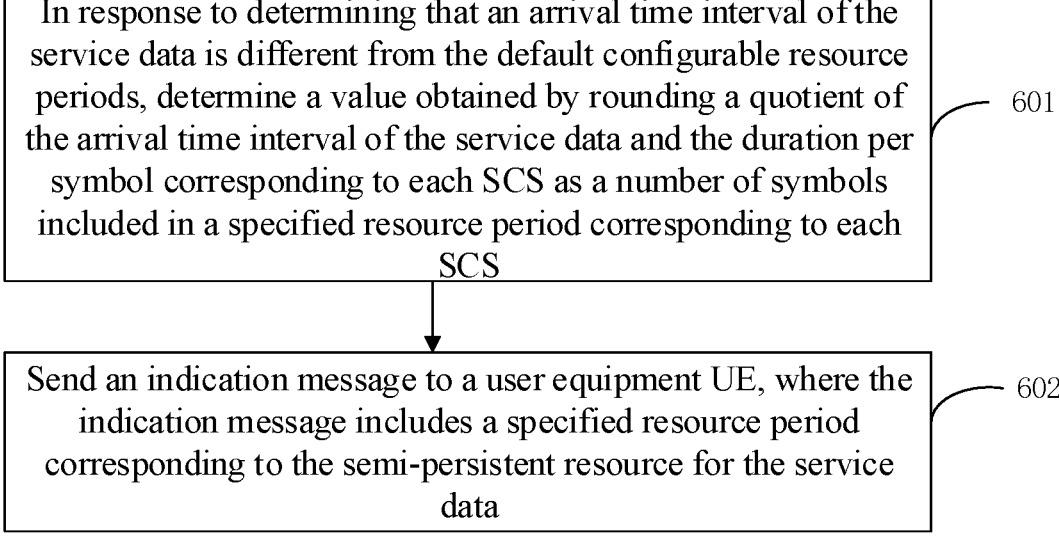

In response to determining that an arrival time interval of the service data is different from the default configurable resource periods, determine a value obtained by rounding a quotient of the arrival time interval of the service data and the duration per symbol corresponding to each SCS as a number of symbols included in a specified resource period corresponding to each SCS ⟋601

Send an indication message to a user equipment UE, where the indication message includes a specified resource period corresponding to the semi-persistent resource for the service data ⟋602

FIG. 6

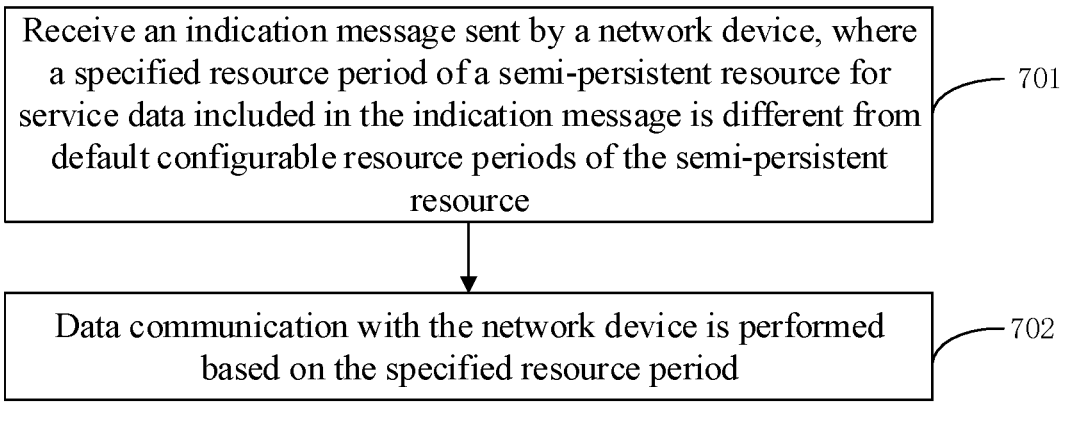

Receive an indication message sent by a network device, where a specified resource period of a semi-persistent resource for service data included in the indication message is different from default configurable resource periods of the semi-persistent resource — 701

Data communication with the network device is performed based on the specified resource period — 702

FIG. 7

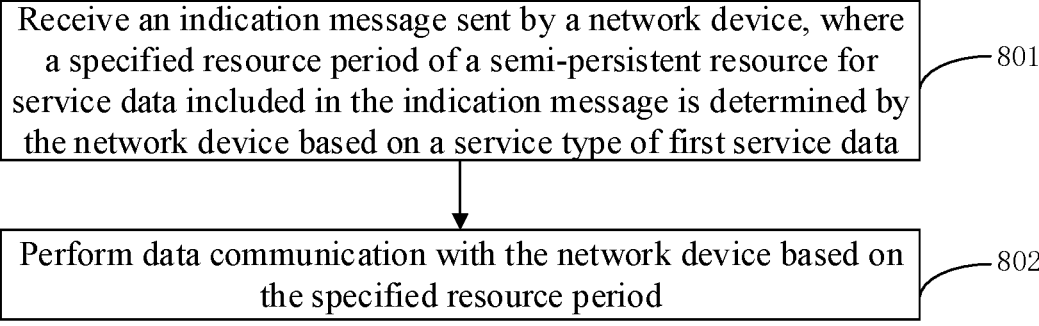

Receive an indication message sent by a network device, where a specified resource period of a semi-persistent resource for service data included in the indication message is determined by the network device based on a service type of first service data — 801

Perform data communication with the network device based on the specified resource period — 802

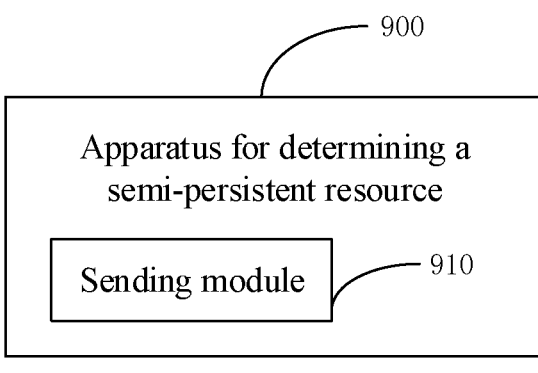

Apparatus for determining a semi-persistent resource

Sending module — 910

FIG. 9

SEMI-PERSISTENT RESOURCE DETERMINATION METHOD AND APPARATUS, AND COMMUNICATION DEVICE

CROSS-REFERENCE TO RELATED APPLICATION

The present application is a U.S. National Stage of International Application No. CT/CN2021/077302, filed on Feb. 22, 2021, the contents of which are incorporated herein by reference in their entirety for all purposes.

TECHNICAL FIELD

The present disclosure relates to the field of mobile communication technologies, and in particular, refers to semi-persistent resource determination methods and apparatuses, and communication devices.

BACKGROUND

To support faster data management in a 5G system, semi-persistent resources are provided for uplink and downlink data, such as a configured grant (CG) resource for uplink data transmission and a semi-persistent scheduling (SPS) resource for downlink data transmission.

In related arts, for the CG resource, resource periods that a network can configure include: 2 orthogonal frequency division multiplexing (OFDM) symbols, 6 OFDM symbols, 7 OFDM symbols, 14 OFDM symbols, n times of 12 OFDM symbols, and n times of 14 OFDM symbols, where n is a positive integer. For the SPS resource, resource periods that the network can configure include: 10 milliseconds (ms), 20 ms, 32 ms, 40 ms, 64 ms, 80 ms, 128 ms, 160 ms, 320 ms, and 640 ms.

In order to reduce the number of scheduling signaling sent and a scheduling delay caused by receiving and processing the scheduling signaling, a network side will configure a semi-persistent resource period for uplink and downlink services. However, when the configured resource period cannot match an arrival time interval of the services, an extra data transmission delay will occur.

SUMMARY

An embodiment of one aspect of the present disclosure proposes a method of determining a semi-persistent scheduling resource, performed by a network device, including: sending an indication message to a user equipment UE, where a specified resource period of a semi-persistent resource for service data included in the indication message is different from default configurable resource periods of the semi-persistent resource.

An embodiment of another aspect of the present disclosure proposes s method of determining a semi-persistent resource, performed by a user equipment, including: receiving an indication message sent by a network device, where a specified resource period of a semi-persistent resource for service data included in the indication message is different from default configurable resource periods of the semi-persistent resource, and performing data communication with the network device based on the specified resource period.

An embodiment of another aspect of the present disclosure proposes a communication device, including: a processor, a memory, and computer programs stored on the memory, the processor runs the computer program, and is configured to: send an indication message to a user equipment (UE), where a specified resource period of a semi-persistent resource for service data included in the indication message is different from default configurable resource periods of the semi-persistent resource.

Additional aspects and advantages of the present disclosure will be set forth in part in the description which follows, and in part will be obvious from the description which follows, or may be learned by practice of the present disclosure.

BRIEF DESCRIPTION OF DRAWINGS

The above-mentioned and/or additional aspects and advantages of the present disclosure will be apparent and easily understood from the following description of embodiments taken in conjunction with the accompanying drawings.

FIG. 1A is a flowchart of a method of determining a semi-persistent resource according to an embodiment of the present disclosure.

FIG. 1B is a flowchart of another method of determining a semi-persistent resource according to an embodiment of the present disclosure.

FIG. 2 is a flowchart of another method of determining a semi-persistent resource according to an embodiment of the present disclosure.

FIG. 3 is a flowchart of another method of determining a semi-persistent resource according to an embodiment of the present disclosure.

FIG. 4 is a flowchart of another method of determining a semi-persistent resource according to an embodiment of the present disclosure.

FIG. 5 is a flowchart of another method of determining a semi-persistent resource according to an embodiment of the present disclosure.

FIG. 6 is a flowchart of another method of determining a semi-persistent resource according to an embodiment of the present disclosure.

FIG. 7 is a flowchart of another method of determining a semi-persistent resource according to an embodiment of the present disclosure.

FIG. 8 is a flowchart of another method of determining a semi-persistent resource according to an embodiment of the present disclosure.

FIG. 9 is a schematic structural diagram of an apparatus for determining a semi-persistent resource according to an embodiment of the present disclosure.

DETAILED DESCRIPTION

Figure 10:
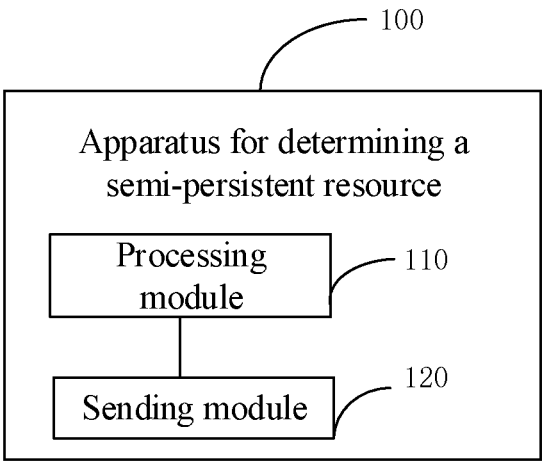
FIG. 10 is a schematic structural diagram of another apparatus for determining a semi-persistent resource according to an embodiment of the present disclosure.

Hereinafter, embodiments of the present disclosure will be described in detail. Examples of the embodiments are illustrated in the accompanying drawings, where the same or similar reference numerals indicate the same or similar elements or elements having the same or similar functions. The embodiments described below, by referring to the accompanying drawings, are exemplary and are intended to explain the present disclosure, and should not be construed as limiting the present disclosure.

In a communication network, when a network device configures a configured grant (CG) resource, it can provide a user equipment (UE) with a period of an uplink resource and a specific allocation of an uplink time-frequency resource through a radio resource control (RRC) message. The UE directly uses the configured uplink resource to send uplink data after receiving the configuration. Or, when configuring a semi-persistent scheduling (SPS) resource, the network device first configures a period of a downlink resource through an RRC message, and then activates and indicates a specific allocation of a downlink time-frequency resource through physical downlink control channel (PDCCH) control signaling. Correspondingly, after the downlink resource is activated by the PDCCH control signaling, the UE may use the configured downlink resource to receive downlink data.

The present disclosure provides a method of determining a semi-persistent resource in response to a problem in the related art, when a resource period of a semi-persistent resource configured by the network device does not match with an arrival time interval of service data to be processed. Thus, an additional data transmission delay will occur. By allocating a specified resource period for the semi-persistent resource, the network device is able to meet the service requirements, thus reducing the transmission delay of service data and improving the quality and performance of service.

In the present disclosure, a semi-continuous resource may be a CG resource, and may further be an SPS resource, which is not limited in the present disclosure. The semi-persistent resource determination methods, apparatuses, and communication devices provided by embodiments of the present disclosure are described in detail below in combination with various embodiments.

FIG. 1A is a flowchart of a method of determining a semi-persistent resource according to an embodiment of the present disclosure. The method can be performed by a network device. As shown in FIG. 1A, the method of determining the semi-persistent resource includes the following step 101.

At step 101, an indication message is sent to a user equipment UE, where a specified resource period of a semi-persistent resource for service data included in the indication message is different from the default configurable resource periods of the semi-persistent resource.

The service data in the present disclosure can be service data supported by any network device and UE, for example, video data, audio data, etc., which is not limited in the present disclosure.

In some examples, the specified resource period may be determined by the network device according to a protocol, or it may also be determined according to a current service data requirement.

In addition, the above indication message may be an RRC message, or may further be PDCCH control signaling, which is not limited by the present disclosure.

It can be understood that, for different semi-persistent resources, the default configurable resource periods are different. According to the existing communication protocols released by the 3GPP organization, for the CG resource, the default configurable resource periods can be: 2 OFDM symbols, 6 OFDM symbols, 7 OFDM symbols, 14 OFDM symbols, n times of 12 OFDM symbols, and n times of 14 OFDM symbols, where n is a positive integer. For the SPS resource, the default configurable resource periods can be: 10 ms, 20 ms, 32 ms, 40 ms, 64 ms, 80 ms, 128 ms, 160 ms, 320 ms, and 640 ms. According to embodiments of the present disclosure, other configurable resource periods can be flexibly added to these default configurable resource periods, so as to be applicable to the scheduling of new services proposed during the evolution of the 5G standard.

In some examples in the present disclosure, the network device may determine the specified resource period according to an arrival time interval of the service data when the arrival time interval of the service data is determined to be different from the default configurable resource periods.

For example, augmented reality (AR) or virtual reality (VR) services can provide users with video streaming services. A typical video frame rate is 30 frames or 60 frames per second, which means that an arrival time interval of video frames is 33.33 ms or 16.66 ms, which is different from the default configurable resource periods of semi-persistent resource (2 OFDM symbols, 6 OFDM symbols, 10 ms, 20 ms, etc.). Therefore, the network device in the present disclosure can determine a current specified resource period of the semi-persistent resource according to an arrival time interval of a video service, and send the specified resource period to the UE, so that uplink and downlink data can be transmitted with the UE based on the specified resource period.

In some examples, the specified resource period may include different contents as required, for example, may include a first period value, where the first period value may be a millisecond value or the number of OFDM symbols.

In some examples, the specified resource period may further include a combination of a first period value and a second period value. The first period value may be a millisecond value or the number of symbols, and the second period value may also be a millisecond value or the number of symbols, etc., which is not limited by the present disclosure.

In order to support a wider range of application scenarios, multiple subcarrier spacing (SCS) may be configured in a wireless communication system. As shown in Table 1 below, different SCSs and cyclic prefixes (CPs) correspond to different resource allocation information.

TABLE 1

| Resource allocation information corresponding to different SCSs | | | | | |
|---|---|---|---|---|---|
| SCS (kHz) | Number of symbols per slot | Duration per symbol (ms) | Number of slots per frame | Duration per slot (ms) | Number of slots per subframe |
| 15 | 14 | 0.0714 | 10 | 1 | 1 |
| 30 | 14 | 0.0357 | 20 | 0.5 | 2 |

TABLE 1-continued

| Resource allocation information corresponding to different SCSs | | | | | |
|---|---|---|---|---|---|
| SCS (kHz) | Number of symbols per slot | Duration per symbol (ms) | Number of slots per frame | Duration per slot (ms) | Number of slots per subframe |
| 60 (Normal CP) | 14 | 0.0179 | 40 | 0.25 | 4 |
| 60 (Extended CP) | 12 | 0.0208 | 40 | 0.25 | 4 |
| 120 | 14 | 0.0089 | 80 | 0.125 | 8 |
| 240 | 14 | 0.0045 | 160 | 0.0625 | 16 |

It can be understood that each element and each correspondence in Table 1 exists independently. These elements and correspondences are listed in the same table by way of example, but it does not mean that all elements and correspondences in the table must exist at the same time, as shown in Table 1. Each element value and each correspondence are independent of any other element values or correspondences in Table 1. Therefore, those skilled in the art can understand that each element value and each correspondence in Table 1, variously, is an independent embodiment.

In the present disclosure, when determining the specified resource period, the network device can determine a specified resource period corresponding to each SCS according to the resource allocation information corresponding to different SCSs, that is, determine the number of symbols and/or millisecond values contained within the specified resource period for each SCS.

In the method of determining the semi-persistent resource in the embodiments of the present disclosure, by setting a specified resource period for the semi-persistent resource to transmit data with the UE based on a resource period that matches an arrival interval of service data to be performed as closely as possible, thereby minimizing the transmission delay of service data, and improving the quality and performance of service.

FIG. 1B is a flowchart of another method of determining a semi-persistent resource according to an embodiment of the present disclosure. The method may be performed by a network device. As shown in FIG. 1B, the method of determining the semi-persistent resource includes the following steps, 101a and 102.

At step 101a, a specified resource period of a semi-persistent resource for first service data is determined based on a service type of the first service data.

In the present disclosure, the network device may first determine a frame interval of the first service data or a time interval when the service data arrives at a UE based on the service type of the first service data, and then determine the specified resource period of the semi-persistent resource for the first service data.

For example, when the network device is waiting to send video service data, the network device can first determine a frame interval of the video service data or a time interval when the video service data arrives at the UE. Then the network device can determine a specified resource period of a semi-persistent resource for the video service data based on the frame interval of the video service data or the time interval when the video service data arrives at the UE. For example, as described below, the specified resource period can be configured to minimize a delay in transmitting the video service data, or to eliminate a delay caused by a mismatch between a configurable resource period specified in an existing communication protocol and a transmission characteristic of the video service data.

In one implementation, the specified resource period of the semi-persistent resource may be configured to be close to or equal to the frame interval or arrival interval of the video service data, thereby ensuring the transmission quality of the video data transmission.

At step 102, an indication message is sent to a user equipment UE. The indication message includes the specified resource period of the semi-persistent resource for the first service data.

Further, the network device may send an indication message to the user equipment, which carries the specified resource period of the semi-persistent resource for the service data.

In some examples, the specified resource period may be different from the configurable resource periods specified in the existing communication protocols. For example, configurable resource periods for a CG resource can be: 2 OFDM symbols, 6 OFDM symbols, 7 OFDM symbols, 14 OFDM symbols, n times of 12 OFDM symbols, and n times of 14 OFDM symbols, where n is a positive integer; or configurable resource periods for an SPS resource can be: 10 ms, 20 ms, 32 ms, 40 ms, 64 ms, 80 ms, 128 ms, 160 ms, 320 ms, and 640 ms.

In the method of determining the semi-persistent resource in the embodiments of the present disclosure, the network device first determines, based on a type of service data, a specified resource period of a semi-persistent resource for the service data, and indicates the specified resource period to the UE to perform data transmission with the UE based on a resource period that matches the type of the service data to be performed, thereby minimizing the transmission delay of the service data, and improving the quality and performance of service.

FIG. 2 is a flowchart of another method of determining a semi-persistent resource according to an embodiment of the present disclosure. The method may be performed by a network device. As shown in FIG. 2, the method of determining the semi-persistent resource includes the following steps 201-204.

At step 201, in response to determining that an arrival time interval of the service data is different from the default configurable resource periods, a duration value corresponding to a default configurable resource period less than the arrival time interval of the service data is determined as a millisecond value m corresponding to a first period value included in a specified resource period corresponding to each SCS. Here, m is a positive integer.

In some examples, when determining the first period value, if a plurality of default configurable resource periods are less than the arrival time interval of the service data, any default configurable resource period from the plurality of default configurable resource periods can be selected, or a default configurable resource period with a smallest difference from the arrival time interval of the service data can further be selected.

For example, if the arrival time interval of the service data is 16.66 ms, for a 15 kHz SCS, when determining a specified resource period corresponding to the SPS, the first period value can be determined to be 10 ms since a default configurable period value less than 16.66 ms is 10 ms.

Additionally or alternatively, if the arrival time interval of the service data is 33.33 ms, for a 15 kHz SCS, when determining a specified resource period corresponding to the SPS, since default configurable period values less than 33.33 ms are 10 ms, 20 ms, and 32 ms, the first period value can be determined to be 10 ms, 20 ms, or 32 ms, or since a difference between 32 ms and 33.33 ms is a smallest difference, the first period value can be determined to be 32 ms.

At step 202, a first difference between the arrival time interval of the service data and m is determined.

At step 203, a number of symbols corresponding to a second period value included in the specified resource period corresponding to each SCS is determined according to the duration per symbol corresponding to each SCS and the first difference.

In some examples, a value obtained by rounding a quotient of the first difference and the duration per symbol corresponding to each SCS can be determined as the number of symbols corresponding to the second period value included in the specified resource period corresponding to each SCS.

The rounding in the embodiment can be rounding down, rounding up, or rounding to the nearest whole number or decimal place, etc.

For example, the arrival time interval of the service data is 16.66 ms, for a 15 kHz SCS, a first period value included in a specified resource period is 10 ms. At this time, the first difference is 6.66 ms. A quotient of the first difference and the duration per symbol (0.0714 ms) corresponding to 15 kHz SCS is 93.277, and a value of rounding 93.277 to the nearest is 93, so that the number of symbols corresponding to the second period value in the specified resource period corresponding to the 15 kHz SCS may be 93.

For another example, the arrival time interval of the service data is 16.66 ms, for a 30 kHz SCS, a first period value included in a specified resource period is 10 ms. At this time, the first difference is 6.66 ms. A quotient of the first difference and the duration per symbol (0.0357 ms) corresponding to 30 kHz SCS is 186.555, and a value of rounding 186.555 to the nearest is 187, so that the number of symbols corresponding to the second period value in the specified resource period corresponding to the 30 kHz SCS may be 187.

For services where arrival time intervals of data are 16.66 ms (the first period value is 10 ms) and 33.33 ms (the first period value is 32 ms), by rounding the quotient of the first difference and the duration per symbol corresponding to each SCS to the nearest, the second period value in the specified resource period corresponding to each SCS can be determined. Configurable values can be shown in Table 2 below.

TABLE 2

| SCS (kHz) | Second period value (corresponding to a service with an arrival time interval of 16.66 ms) | Second period value (corresponding to a service with an arrival time interval of 33.33 ms) |
| --- | --- | --- |
| 15 | 93 | 19 |
| 30 | 187 | 37 |
| 60 (Normal CP) | 372 | 74 |
| 60 (Extended CP) | 320 | 64 |
| 120 | 748 | 150 |
| 240 | 1480 | 296 |

It can be understood that each element and each correspondence in Table 2 exists independently. These elements and correspondences are listed in the same table by way of example, but it does not mean that all elements and correspondences in the table must exist at the same time, as shown in Table 2. Each element value and each correspondence are independent of any other element values or correspondences in Table 2. Therefore, those skilled in the art can understand that each element value and each correspondence in Table 2, variously, is an independent embodiment.

It should be noted that a value obtained by rounding up or down the quotient of the first difference and the duration per symbol corresponding to each SCS can further be determined as the second period value in the specified resource period corresponding to each SCS, which is not limited by the present disclosure.

In some examples, for a normal CP, as can be seen from Table 1, the duration per symbol and number of slots per frame corresponding to each SCS have a certain multiple relationship. In the present disclosure, any SCS can further be determined as a specified SCS, so that after a specified resource period corresponding to the specified SCS is determined, a specified resource period corresponding to each SCS can be determined based on the specified resource period corresponding to the specified SCS.

In the present disclosure, a value is obtained by rounding a quotient of the first difference and a duration per symbol corresponding to a specified SCS, and the value multiplying a ratio of a number of slots per frame corresponding to each SCS to a number of slots per frame corresponding to the specified SCS can further be determined as the number of symbols corresponding to the second period value included in the specified resource period corresponding to each SCS.

For example, for a service where an arrival time interval of service data is 16.66 ms, based on the above analysis, the number of symbols corresponding to the second period value is 93 for a 15 kHz SCS (the number of slots per frame is 10). If the 15 kHz SCS is the specified SCS, the number of symbols corresponding to the second period value included in the specified resource period corresponding to the 30 kHz SCS (the number of slots per frame is 20) is 93*(20/10)=186.

In addition, for an extended CP, because the number of symbols per slot is different from that of a normal CP when the duration per slot is the same as that of the normal CP, a specified resource period corresponding to the extended CP can be calculated by any method of calculating the specified resource period in the present disclosure.

For example, if the 15 kHz SCS is a specified resource period, in the case that a service with an arrival time interval of data is 16.66 ms, as well as a first period value is 10 ms and a second period value is 93 symbols in a specified resource period corresponding to the 15 kHz SCS, it can be determined that a first period value is 10 ms and a second period value is 93*2 in a specified resource period corresponding to 30 kHz SCS, where 2 is a ratio of the number of time slots per frame of the 30 kHz SCS to the number of time slots per frame of the 15 kHz SCS. Analogously, a specified resource period corresponding to each SCS for a normal CP can be determined.

For services where arrival time intervals of data are 16.66 ms (the first period value is 10 ms, and the second period value is 6 ms) and 33.33 ms (the first period value is 32 ms, and the second period value is 1 ms), under the condition that the 15 kHz SCS is a specified SCS, according to relationships between the number of slots per frame among different SCS, the second period value in the specified resource period corresponding to each SCS can be determined. Configurable values can be shown in Table 3 below.

TABLE 3

| SCS (kHz) | Second period value (corresponding to a service with an arrival time interval of 16.66 ms) | Second period value (corresponding to a service with an arrival time interval of 33.33 ms) |
|---|---|---|
| 15 | 93 | 19 |
| 30 | 186 | 38 |
| 60 (Normal CP) | 372 | 76 |
| 60 (Extended CP) | 320 | 64 |
| 120 | 744 | 152 |
| 240 | 1488 | 304 |

It can be understood that each element an each correspondence in a e exists independently. These elements and correspondences are listed in the same table by way of example, but it does not mean that all elements and correspondences in the table must exist at the same time, as shown in Table 3. Each element value and each correspondence are independent of any other element values or correspondences in Table 3. Therefore, those skilled in the art can understand that each element value and each correspondence in Table 3, variously, is an independent embodiment.

It should be noted that when calculating the specified resource period corresponding to the SPS resource or the CG resource under each SCS, the method in any embodiment of the present disclosure can be adopted as required, and the present disclosure does not limit this.

Returning to FIG. 2, at step 204, an indication message is sent to a user equipment UE. The indication message includes the specified resource period corresponding to the semi-persistent resource for the service data.

The type or content of the above indication message can refer to the detailed description of any embodiment, which is not repeated here.

According to the method of determining the semi-persistent resource in the embodiment of the present disclosure, a network device, when determining that an arrival time interval of service data is different from the default configurable resource periods, indicates to the UE a specified resource period that matches the arrival time interval of the service data to perform data communication with the UE based on the specified resource period. Thus, minimizing the communication delay of service data and improving the quality and performance of service.

FIG. 3 is a flowchart of another method of determining a semi-persistent resource according to an embodiment of the present disclosure. The method may be performed by a network device. As shown in FIG. 3, the method of determining the semi-persistent resource includes the following steps 301-304.

At step 301, in response to determining that an arrival time interval of the service data is different from the default configurable resource periods, a millisecond value n corresponding to a first period value included in a specified resource period corresponding to each SCS is determined according to a quotient S of the arrival time interval of the service data and a duration per slot corresponding to a specified SCS. Here, n is a positive integer, and the specified SCS can be selected as required, for example, an SCS with a duration per slot of 1 ms is selected.

In some examples, the millisecond value n corresponding to the first period value may be determined based on the size of the quotient S, or the relationship between the quotient S and various default configurable periods.

For example, an integer part of the quotient S is determined as the millisecond value n corresponding to the first period value included in the specified resource period corresponding to each SCS.

For example, the arrival time interval of service data is 16.66 ms, a specified SCS is 15 kHz SCS, and a corresponding duration time slot is 1 ms, so the quotient S is 16.66. Then 16 can be determined as the millisecond value n corresponding to the first period value included in the specified resource period corresponding to the 15 kHz SCS.

Additionally, or alternatively, a maximum multiple value of a first specified value included within a value range of S may further be determined as the millisecond value n corresponding to the first period value included in the specified resource period corresponding to each SCS.

The first specified value may be a value agreed upon by a protocol, or a value configured by a network, for example, it may be 2, 5, or 10, etc., and the present disclosure is not limited thereto.

For example, if the first specified value is 5, for a service where the arrival interval of the service data is 16.66 ms, since the quotient S of 15 kHz SCS is 16.66, 15 (the largest multiple of 5) may be determined as the millisecond value n corresponding to the first period value included in the specified resource period corresponding to the 15 kHz SCS.

Additionally, or alternatively, a duration value corresponding to a default configurable resource period less than the quotient S is determined as the millisecond value n corresponding to the first period value included in the specified resource period corresponding to each SCS.

In some examples, when determining the first period value, if a plurality of default configurable resource periods are less than the quotient S, any default configurable resource period from the plurality of default configurable resource periods can be selected, or a default configurable resource period with the smallest difference from the quotient S can be selected.

For example, if the arrival time interval of the service data is 16.66 ms, for a 15 kHz SCS, when determining a specified resource period corresponding to the SPS, the millisecond value n corresponding to the first period value can be determined to be 10, since a default configurable period value less than S (16.66) is 10 ms.

Additionally, or alternatively, if the arrival time interval of the service data is 33.33 ms, for a 15 kHz SCS, when determining a specified resource period corresponding to the SPS, since default configurable period values less than S (33.33) are 10 ms, 20 ms, and 32 ms, and a difference between 32 ms and 33.33 ms is the smallest, the millisecond value n corresponding to the first period value can be determined to be 32.

At step 302, a second difference between the arrival time interval of the service data and the n is determined.

At step 303, a number of symbols corresponding to a second period value included in the specified resource period corresponding to each SCS is determined according to the duration per symbol corresponding to each SCS and the second difference.

In this embodiment, a specific manner of determining a number of symbols corresponding to a second period value included in the specified resource period corresponding to each SCS, according to the duration per symbol corresponding to each SCS, and the second difference may be described in detail with reference to any other embodiment and will not be repeated herein.

At step 304, an indication message is sent to a user equipment UE, where the indication message includes a specified resource period corresponding to the semi-persistent resource for the service data.

According to the method of determining the semi-persistent resource in the embodiment of the present disclosure, a network device, when determining that an arrival time interval of service data is different from the default configurable resource periods, indicates to the UE a specified resource period that matches the arrival time interval of the service data to perform data communication with the UE based on the specified resource period. Thus, the method minimizes the communication delay of service data and improves the quality and performance of service.

FIG. 4 is a flowchart of another method of determining a semi-persistent resource according to an embodiment of the present disclosure. The method may be performed by a network device. As shown in FIG. 4, the method of determining the semi-persistent resource includes the following steps 401-406.

At step 401, in response to determining that an arrival time interval of the service data is different from the default configurable resource periods, a duration value corresponding to a default configurable resource period less than the arrival time interval of the service data is determined as a millisecond value o corresponding to a first period value included in a specified resource period corresponding to each SCS.

In this embodiment, a specific process of determining a first period value included in the specified resource period corresponding to each SCS may be described in detail with reference to any other embodiment and will not be repeated herein.

Here, o is a positive integer.

At step 402, a third difference between the arrival time interval of the service data and the o is determined.

At step 403, a value obtained by rounding a quotient of the third difference and the duration per slot corresponding to each SCS is determined as a millisecond value k corresponding to the second period value included in the specified resource period corresponding to each SCS. Here, k is a positive integer.

In some examples, a value obtained by rounding down the quotient of the third difference and the duration per slot corresponding to each SCS can be determined as the millisecond value k corresponding to the second period value included in the specified resource period corresponding to each SCS.

For example, for a service with an arrival time interval of a service data is 16.66 ms, if a millisecond value n corresponding to a first period value included in a specified resource period corresponding to 15 kHz SCS (duration per slot is 1 ms) is 10, the third difference is 6.66 ms. A quotient of the third difference 6.66 ms and the duration per slot 1 ms is 6.66, thus it can be determined that a millisecond value corresponding to the second period value included in the specified resource period corresponding to the 15 kHz SCS is 6.

Similarly, for a service with an arrival time interval of a service data is 33.33 ms, if a millisecond value n corresponding to a first period value included in a specified resource period corresponding to 30 kHz SCS (duration per slot is 0.5 ms) is 32, the third difference is 1.33 ms. A quotient of the third difference 1.33 ms and the duration per slot 0.5 ms is 2.66, thus it can be determined that a millisecond value corresponding to the second period value included in the specified resource period corresponding to the 30 kHz SCS is 2*0.5 ms.

At step 404, a fourth difference between the third difference and the k is determined.

At step 405, a number of symbols corresponding to a third period value included in the specified resource period corresponding to each SCS is determined according to the duration per symbol corresponding to each SCS and the fourth difference.

In some examples, a value obtained by rounding a quotient of the fourth difference and the duration per symbol corresponding to each SCS may be determined as the number of symbols corresponding to the third period value included in the specified resource period corresponding to each SCS.

In some examples, the number of symbols corresponding to the third period value included in the specified resource period corresponding to each SCS can be determined by rounding down, rounding up, rounding to the nearest, etc.

For example, the arrival time interval of the service data is 16.66 ms, for a 15 kHz SCS, a first period value included in a specified resource is 10 ms, and a second period value included in the specified resource is 6 ms. At this time, the fourth difference is 0.66 ms. A quotient of the fourth difference and the duration per symbol (0.0714 ms) corresponding to 15 kHz SCS of 9.243, and a value of rounding up 9.243 is 10, so that the number of symbols corresponding to the third period value in the specified resource period corresponding to the 15 kHz SCS may be 10.

For another example, the arrival time interval of the service data is 16.66 ms, for a 30 kHz SCS, a first period value included in a specified resource is 10 ms, and a second period value included in the specified resource is 6 ms. At this time, the fourth difference is 0.66 ms. A quotient of the fourth difference and the duration per symbol (0.0357 ms) corresponding to 30 kHz SCS of 18.49, and a value of rounding up 18.49 is 19, so that the number of symbols corresponding to the third period value in the specified resource period corresponding to the 30 kHz SCS may be 19.

For services where arrival time intervals of data are 16.66 ms (the first period value is 10 ms, and the second period value is 6 ms) and 33.33 ms (the first period value is 32 ms, and the second period value is 1 ms), by rounding the quotient of the fourth difference and the duration per symbol corresponding to each SCS, the third period value in the specified resource period corresponding to each SCS can be determined. Configurable values can be shown in Table 4 below.

TABLE 4

| SCS (kHz) | Third period value (corresponding to a service with an arrival time interval of 16.66 ms) | Third period value (corresponding to a service with an arrival time interval of 33.33 ms) |
| --- | --- | --- |
| 15 | 10 | 5 |
| 30 | 19 | 10 |
| 60 (Normal CP) | 37 | 19 |
| 60 (Extended CP) | 32 | 16 |
| 120 | 74 | 37 |
| 240 | 147 | 74 |

It can be understood that each element and each correspondence in Table 4 exists independently. These elements and correspondences are listed in the same table by way of example, but it does not mean that all elements and correspondences in the table must exist at the same time as shown in Table 4. Each element value and each correspondence are independent of any other element values or correspondences in Table 4. Therefore, those skilled in the art can understand that each element value and each correspondence in Table 4, variously, is an independent embodiment.

It should be noted that a value obtained by rounding up or down the quotient of the fourth difference and the duration per symbol corresponding to each SCS can further be determined as the second period value in the specified resource period corresponding to each SCS, which is not limited by the present disclosure.

In some examples, for a normal CP, as can be seen from Table 1, the duration per symbol and number of slots per frame corresponding to each SCS have a certain multiple relationship. In the present disclosure, any SCS can further be determined as a specified SCS, so that after a specified resource period corresponding to the specified SCS is determined, a specified resource period corresponding to each SCS can be determined based on the specified resource period corresponding to the specified SCS.

In the present disclosure, a value obtained by rounding a quotient of the fourth difference and a duration per symbol corresponding to a specified SCS, and the value multiplies a ratio of a number of slots per frame corresponding to each SCS to a number of slots per frame corresponding to the specified SCS can further be determined as the number of symbols corresponding to the third period value included in the specified resource period corresponding to each SCS.

In addition, for an extended CP, because the number of symbols per slot is different from that of a normal CP when the duration per slot is the same as that of the normal CP, a specified resource period corresponding to the extended CP can be calculated by any method of calculating the specified resource period in the present disclosure.

For example, if the 15 kHz SCS (a number of slots per frame is 10) is a specified SCS, in the case that a service with an arrival time interval of data is 16.66 ms, as well as a first period value is 10 ms, a second period value is 6 ms and a third period value is 10 symbols (9.243 is rounded up) in a specified resource period corresponding to 15 kHz SCS, it can be determined that a first period value is 10 ms, a second period value is 6 ms and a third period value is 10*2 in a specified resource period corresponding to 30 kHz SCS (a number of slots per frame is 20), where 2 is a ratio of a number of time slots per frame of the 30 kHz SCS to a number of time slots per frame of the 15 kHz SCS. Analogously, a specified resource period corresponding to each SCS can be determined.

For services where arrival time intervals of data are 16.66 ms (the first period value is 10 ms, and the second period value is 6 ms) and 33.33 ms (the first period value is 32 ms, and the second period value is 1 ms), under the condition that the 15 kHz SCS is a specified SCS, according to relationships between the number of slots per frame among different SCS, the third period value in the specified resource period corresponding to each SCS for the normal CP can be determined. Configurable values can be shown in Table 5 below.

TABLE 5

| SCS (kHz) | Third period value (corresponding to a service with an arrival time interval of 16.66 ms) | Third period value (corresponding to a service with an arrival time interval of 33.33 ms) |
| --- | --- | --- |
| 15 | 10 | 5 |
| 30 | 20 | 10 |
| 60 (Normal CP) | 40 | 20 |
| 60 (Extended CP) | 32 | 16 |
| 120 | 80 | 40 |
| 240 | 160 | 80 |

It can be understood that each element and each correspondence in Table 5 exists independently. These elements and correspondences are listed in the same table by way of example, but it does not mean that all elements and correspondences in the table must exist at the same time, as shown in Table 5. Each element value and each correspondence are independent of any other element values or correspondences in Table 5. Therefore, those skilled in the art can understand that each element value and each correspondence in Table 5, variously, is an independent embodiment.

It should be noted that when calculating the specified resource period corresponding to the SPS resource or the CG resource under each SCS, the method in any embodiment of the present disclosure can be adopted as required, and the present disclosure does not limit this.

Returning to FIG. 4, at step 406, an indication message is sent to a user equipment UE where the indication message includes a specified resource period corresponding to the semi-persistent resource for the service data.

The type or content of the above indication message can refer to the detailed description of any embodiment, which is not repeated here.

According to the method of determining the semi-persistent resource in the embodiment of the present disclosure, a network device, when determining that an arrival time interval of service data is different from the default configurable resource periods, indicates to the UE a specified resource period that matches the arrival time interval of the service data to perform data communication with the UE based on the specified resource period. Thereby minimizing the communication delay of service data, and improving the quality and performance of service.

FIG. 5 is a flowchart of another method of determining a semi-persistent resource according to an embodiment of the present disclosure. The method may be performed by a network device. As shown in FIG. 5, the method of determining the semi-persistent resource includes the following steps 501-504.

At step 501, in response to determining that an arrival time interval of the service data is different from the default configurable resource periods, a quotient S of the arrival time interval of the service data and the duration per slot corresponding to each SCS is determined.

At step 502, a product between an integer part of the quotient S and a number of symbols per slot corresponding to each SCS is determined as a number of symbols corresponding to the first period value included in the specified resource period corresponding to each SCS.

For example, if the arrival time interval of service data is 16.66 ms, a duration per time slot corresponding to a 15 kHz SCS is 1 ms, and a number of symbols per time slot corresponding to the 15 kHz SCS is 14. For the 15 kHz SCS, a quotient S equals 16.66; thus, it can be determined that a number of symbols corresponding to the first period value included in the specified resource period corresponding to the 15 kHz SCS is 16*14.

In another example, if the arrival time interval of service data is 16.66 ms, a duration per time slot corresponding to a 30 kHz SCS is 0.5 ms, and a number of symbols per time slot corresponding to the 30 kHz SCS is 14. For the 30 kHz SCS, a quotient S equals 33.32; thus, it can be determined that a number of symbols corresponding to the first period value included in the specified resource period corresponding to the 30 kHz SCS is 33*14.

For services where arrival time intervals of data are 16.66 ms and 33.33 ms, when a product between an integer part of a quotient S of the arrival time interval of the service data and the duration per slot corresponding to each SCS and the number of symbols per slot corresponding to each SCS is determined as the number of symbols corresponding to the first period value included in the specified resource period corresponding to each SCS, configurable values of the first period value corresponding to each SCS can be shown in the following Table 6.

TABLE 6

| SCS (kHz) | First period value (corresponding to a service with an arrival time interval of 16.66 ms) | First period value (corresponding to a service with an arrival time interval of 33.33 ms) |
|---|---|---|
| 15 | 16*14 | 33*14 |
| 30 | 33*14 | 66*14 |
| 60 (Normal CP) | 66*14 | 133*14 |
| 60 (Extended CP) | 66*12 | 133*12 |
| 120 | 133*14 | 266*14 |
| 240 | 266*14 | 533*14 |

It can be understood that each element and each correspondence in Table 6 exists independently. These elements and correspondences are listed in the same table by way of example, but it does not mean that all elements and correspondences in the table must exist at the same time, as shown in Table 6. Each element value and each correspondence are independent of any other element values or correspondences in Table 6. Therefore, those skilled in the art can understand that each element value and each correspondence in Table 6, variously, is an independent embodiment.

At step 503, a number of symbols corresponding to a second period value included in the specified resource period corresponding to each SCS is determined according to the duration per symbol corresponding to each SCS and a decimal part of the quotient S.

In some examples, a value obtained by rounding a quotient of the decimal part of the quotient S and the duration per symbol corresponding to each SCS can be determined as the number of symbols corresponding to the second period value included in the specified resource period corresponding to each SCS.

For example, for services where arrival time intervals of data are 16.66 ms and 33.33 ms, when the quotient of the decimal part of the S and the duration per symbol corresponding to each SCS is rounded up and is determined to be the number of symbols corresponding to the second period value in resource period corresponding to each SCS, configurable values can be shown in Table 7 below.

It can be understood that each element and each correspondence in Table 7 exists independently. These elements and correspondences are listed in the same table by way of example, but it does not mean that all elements and correspondences in the table must exist at the same time, as shown in Table 7. Each element value and each correspondence are independent of any other element values or correspondences in Table 7. Therefore, those skilled in the art can understand that each element value and each correspondence in Table 7, variously, is an independent embodiment.

It should be noted that a value obtained by rounding up or to the nearest the quotient of the decimal part of the S and the duration per symbol corresponding to each SCS can further be determined as the number of symbols corresponding to the second period value in the specified resource period corresponding to each SCS, which is not limited by the present disclosure.

TABLE 7

| SCS (kHz) | Second period value (corresponding to a service with an arrival time interval of 16.66 ms) | Second period value (corresponding to a service with an arrival time interval of 33.33 ms) |
|---|---|---|
| 15 | 10 | 5 |
| 30 | 5 | 10 |
| 60 (Normal CP) | 9 | 5 |
| 60 (Extended CP) | 9 | 5 |
| 120 | 4 | 9 |
| 240 | 8 | 4 |

In some examples, as can be seen from Table 1, the duration per symbol and duration per slot corresponding to each SCS have a certain multiple relationship. In the present disclosure, any SCS can further be determined as a specified SCS, so that after the number of symbols corresponding to a second period value in a specified resource period corresponding to the specified SCS is determined. The number of symbols corresponding to a second period value in a specified resource period corresponding to each SCS can be determined based on the number of symbols corresponding to the second period value in the specified resource period corresponding to the specified SCS.

That is, in the present disclosure, a value is obtained by rounding a quotient of the decimal part of the quotient S and a duration per symbol corresponding to a specified SCS, and the value multiplying a ratio of a number of slots per frame corresponding to each SCS to a number of slots per frame corresponding to the specified SCS can further be determined as the number of symbols corresponding to the second period value included in the specified resource period corresponding to each SCS.

In addition, for an extended CP, because the number of symbols per slot is different from that of a normal CP when the duration per slot is the same as that of the normal CP, a specified resource period corresponding to the extended CP can be calculated by any method of calculating the specified resource period in the present disclosure.

For example, for services where arrival time intervals of data are 16.66 ms and 33.33 ms, under the condition that the 15 kHz SCS is a specified SCS, according to relationships between the number of slots per frame among different SCSs, the second period value in the specified resource period corresponding to each SCS can be determined. Configurable values can be shown in Table 8 below.

TABLE 8

| SCS (kHz) | Second period value (corresponding to a service with an arrival time interval of 16.66 ms) | Second period value (corresponding to a service with an arrival time interval of 33.33 ms) |
|---|---|---|
| 15 | 10 | 5 |
| 30 | 20 | 10 |
| 60 (Normal CP) | 40 | 20 |
| 60 (Extended CP) | 32 | 16 |
| 120 | 80 | 40 |
| 240 | 160 | 80 |

It can be understood that each element and each correspondence in Table 8 exists independently. These elements and correspondences are listed in the same table by way of example, but it does not mean that all elements and correspondences in the table must exist at the same time, as shown in Table 8. Each element value and each correspondence are independent of any other element values or correspondences in Table 8. Therefore, those skilled in the art can understand that each element value and each correspondence in Table 8, variously, is an independent embodiment.

It should be noted that when calculating the specified resource period corresponding to the SPS resource or the CG resource under each SCS, the method in any embodiment of the present disclosure can be adopted as required, and the present disclosure does not limit this.

In some examples, in the present disclosure, after the number of symbols corresponding to a first period value in the specified resource period corresponding to a specified SCS is determined, the number of symbols corresponding to a first period value in the specified resource period corresponding to each SCS can be determined based on the number of symbols corresponding to the first period value in the specified resource period corresponding to the specified SCS.

That is, in the present disclosure, a first number of symbols corresponding to a first period value and a second number of symbols corresponding to a second period value included in a specified resource period corresponding to a specified SCS may be first determined. Then, the first number of symbols, multiplied by a ratio of a number of slots per frame corresponding to each SCS to a number of slots per frame corresponding to the specified SCS, is determined to be the number of symbols corresponding to the first period value included in the specified resource period corresponding to each SCS. And the second number of symbols, multiplied by a ratio of the number of slots per frame corresponding to each SCS to the number of slots per frame corresponding to the specified SCS, as the number of symbols corresponding to the second period value included in the specified resource period corresponding to each SCS.

In addition, for an extended CP, because the number of symbols per slot is different from that of a normal CP when the duration per slot is the same as that of the normal CP, a specified resource period corresponding to the extended CP can be calculated by any method of calculating the specified resource period in the present disclosure.

For example, for services where arrival time intervals of data are 16.66 ms and 33.33 ms, under the condition that the 15 kHz SCS is a specified SCS, according to relationships between the number of slots per frame among different SCSs, the first period value in the specified resource period corresponding to each SCS can be determined. Configurable values can be shown in Table 9 below.

TABLE 9

| SCS (kHz) | First period value (corresponding to a service with an arrival time interval of 16.66 ms) | First period value (corresponding to a service with an arrival time interval of 33.33 ms) |
|---|---|---|
| 15 | 16*14 | 33*14 |
| 30 | 32*14 | 66*14 |
| 60 (Normal CP) | 64*14 | 132*14 |
| 60 (Extended CP) | 64*12 | 132*12 |
| 120 | 128*14 | 264*14 |
| 240 | 256*14 | 528*14 |

It can be understood that each element and each correspondence in Table 9 exists independently. These elements and correspondences are listed in the same table by way of example, but it does not mean that all elements and correspondences in the table must exist at the same time, as shown in Table 9. Each element value and each correspondence are independent of any other element values or correspondences in Table 9. Therefore, those skilled in the art can understand that each element value and each correspondence in Table 9, variously, is an independent embodiment.

Returning to FIG. 5, at step 504, an indication message is sent to a user equipment UE where the indication message includes a specified resource period corresponding to the semi-persistent resource for the service data.

The type or content of the above indication message can refer to the detailed description of any embodiment, which is not repeated here.

According to the method of determining the semi-persistent resource in the embodiment of the present disclosure, a network device, when determining that an arrival time interval of service data is different from the default configurable resource periods, may indicate to the UE a specified resource period that matches the arrival time interval of the service data to perform data communication with the UE based on the specified resource period. Thus, minimizing the communication delay of service data and improving the quality and performance of service.

FIG. 6 is a flowchart of another method of determining a semi-persistent resource according to an embodiment of the present disclosure. The method can be performed by a network device. As shown in FIG. 6, the method of determining the semi-persistent resource includes the following steps 601 and 602.

At step 601, in response to determining that an arrival time interval of the service data is different from the default configurable resource periods, a value obtained by rounding a quotient of the arrival time interval of the service data and the duration per symbol corresponding to each SCS is determined as a number of symbols included in a specified resource period corresponding to each SCS.

For example, for services where arrival time intervals of data are 16.66 ms and 33.33 ms, when a value obtained by rounding down the quotient of the arrival time interval of the service data and the duration per symbol corresponding to each SCS is determined as the number of symbols included in the specified resource period corresponding to each SCS, configurable values of the specified resource period corresponding to each SCS can be shown in the following Table 10.

TABLE 10

| SCS (kHz) | First period value (corresponding to a service with an arrival time interval of 16.66 ms) | First period value (corresponding to a service with an arrival time interval of 33.33 ms) |
|---|---|---|
| 15 | 233 | 466 |
| 30 | 466 | 933 |
| 60 (Normal CP) | 930 | 1862 |
| 60 (Extended CP) | 800 | 1602 |
| 120 | 1871 | 3744 |
| 240 | 3702 | 7406 |

It can be understood that each element and each correspondence in Table 10 exists independently. These elements and correspondences are listed in the same table by way of example, but it does not mean that all elements and correspondences in the table must exist at the same time, as shown in Table 10. Each element value and each correspondence are independent of any other element values or correspondences in Table 10. Therefore, those skilled in the art can understand that each element value and each correspondence in Table 10, variously, is an independent embodiment.

It should be noted that a value obtained by rounding up or to the nearest quotient of the arrival time interval of the service data and the duration per symbol corresponding to each SCS, can further be determined as the number of symbols included in the specified resource period corresponding to each SCS, which is not limited by the present disclosure.

In some examples, for a normal CP, as can be seen from Table 1, the duration per symbol and number of slots per frame corresponding to each SCS have a certain multiple relationship. In the present disclosure, any SCS can further be determined as a specified SCS, so that after the number of symbols included in a specified resource period corresponding to the specified SCS is determined. The number of symbols included in a specified resource period corresponding to each SCS can be determined based on the number of symbols included in the specified resource period corresponding to the specified SCS.

That is, in the present disclosure, a value is obtained by rounding a quotient of the arrival time interval of the service data and a duration per symbol corresponding to a specified SCS. And the value multiplying a ratio of a number of slots per frame corresponding to each SCS to a number of slots per frame corresponding to the specified SCS can further be determined as the number of symbols included in the specified resource period corresponding to each SCS.

In addition, for an extended CP, because the number of symbols per slot is different from that of a normal CP when the duration per slot is the same as that of the normal CP, a specified resource period corresponding to the extended CP can be calculated by any method of calculating the specified resource period in the present disclosure.

For example, for services where arrival time intervals of data are 16.66 ms and 33.33 ms, under the condition that the 15 kHz SCS is a specified SCS, according to relationships between the number of slots per frame among different SCS, it can be determined that the number of symbols included in the specified resource period corresponding to each SCS for the normal CP, and can be shown in the following Table 11.

TABLE 11

| SCS (kHz) | First period value (corresponding to a service with an arrival time interval of 16.66 ms) | First period value (corresponding to a service with an arrival time interval of 33.33 ms) |
|---|---|---|
| 15 | 233 | 466 |
| 30 | 466 | 932 |
| 60 (Normal CP) | 932 | 1864 |
| 60 (Extended CP) | 801 | 1602 |
| 120 | 1864 | 3728 |
| 240 | 3728 | 7456 |

It can be understood that each element and each correspondence in Table 11 exists independently. These elements and correspondences are listed in the same table by way of example, but it does not mean that all elements and correspondences in the table must exist at the same time, as shown in Table 11. Each element value and each correspondence are independent of any other element values or correspondences in Table 11. Therefore, those skilled in the art can understand that each element value and each correspondence in Table 11, variously, is an independent embodiment.

Returning to FIG. 6, at step 602, an indication message is sent to a user equipment UE. The indication message includes a specified resource period corresponding to the semi-persistent resource for the service data.

The type or content of the above indication message can refer to the detailed description of any embodiment, which is not repeated here.

According to the method of determining the semi-persistent resource in the embodiment of the present disclosure, a network device, when determining that an arrival time interval of service data is different from the default configurable resource periods, may indicate to the UE a specified resource period that matches the arrival time interval of the service data to perform data communication with the UE based on the specified resource period. Based on this, the method is able to minimize the communication delay of service data and improve the quality and performance of service.

FIG. 7 is a flowchart of another method of determining a semi-persistent resource according to an embodiment of the present disclosure. The method can be performed by a UE.

As shown in FIG. 7, the method of determining the semi-persistent resource includes the following steps 701 and 702.

At step 701, an indication message sent by a network device is received where a specified resource period of a semi-persistent resource for service data included in the indication message is different from the default configurable resource periods of the semi-persistent resource.

The indication message may include a number of symbols and/or a millisecond value included in a specified resource period corresponding to each subcarrier spacing SCS. For example, the indication message may include the number of symbols included in a specified resource period of an SPS resource corresponding to a 15 kHz SCS, or a millisecond value plus the number of symbols included in the specified resource period of the SPS resource corresponding to the 15 kHz SCS, etc., which is not limited by the present disclosure.

That is, the above-mentioned specified resource period may only include a first period value, such as a millisecond value, or the number of symbols, or the specified resource period may further include a first period value plus a second period value, such as a millisecond value plus the number of symbols, or the number of symbols plus the number of symbols, etc.

In some examples, if the specified resource period includes the first period value plus the second period value, the first period value may be a duration value corresponding to the default configurable resource period.

For example, for a service with an arrival interval of data is 16.66 ms, the specified resource period may include a first period value (10 ms) and a second period value (10 symbols) at 15 kHz, where 10 ms is a default configurable resource period for the SPS resource.

In this embodiment, the type of indication message, the type of semi-persistent resource, and the manner to determine the specified resource period can refer to the detailed descriptions of other embodiments of the present disclosure, which are not repeated here.

At step 702, data communication with the network device is performed based on the specified resource period.

The UE determines the specified resource period corresponding to the semi-persistent resource according to the indication message sent by the network device, and can use a corresponding semi-persistent resource according to the specified resource period of the configured semi-persistent resource after the semi-persistent resource is activated. For example, for an uplink CG resource, after RRC configuration, data is sent using the uplink resource according to the specified resource period configured by RRC. Or, for a downlink SPS resource, after RRC configuration and the resource is activated by PDCCH, data is received using the downlink resource according to the specified resource period configured by RRC.

It can be understood that in the present disclosure, the indication message received by the UE is sent by the network device according to an arrival time interval of service data when it is determined that the arrival time interval of the service data is different from each default configurable resource period, so that the indicated specified resource period matches the arrival time interval of the service data as much as possible to reduce the transmission delay of the service data.

In the method of determining the semi-persistent resource in the embodiments of the present disclosure, the UE communicates with the network device through the specified resource period matched with the arrival time interval of the service data. Thereby reducing the communication delay of the service data as much as possible and improving the quality and performance of the service.

FIG. 8 is a flowchart of another method of determining a semi-persistent resource according to an embodiment of the present disclosure. The method can be performed by a UE. As shown in FIG. 8, the method of determining the semi-persistent resource includes the following steps 801 and 802.

At step 801, an indication message sent by a network device is received. A specified resource period of a semi-persistent resource for service data included in the indication message is determined by the network device based on a service type of the first service data.

The indication message may include a number of symbols and/or a millisecond value included in a specified resource period corresponding to each subcarrier spacing SCS. For example, the indication message may include the number of symbols included in a specified resource period of an SPS resource corresponding to a 15 kHz SCS, or a millisecond value plus the number of symbols included in the specified resource period of the SPS resource corresponding to the 15 kHz SCS, etc., which is not limited by the present disclosure.

That is, the above-mentioned specified resource period may only include a first period value, such as a millisecond value, or the number of symbols, or the specified resource period may further include a first period value plus a second period value, such as a millisecond value plus the number of symbols, or the number of symbols plus the number of symbols, etc.

In some examples, if the specified resource period includes the first period value plus the second period value, the first period value may be a duration value corresponding to the default configurable resource period.

For example, for a service with an arrival interval of data is 16.66 ms, the specified resource period may include a first period value (10 ms) and a second period value (10 symbols) at 15 kHz, where 10 ms is a default configurable resource period for the SPS resource.

In the present disclosure, when the network device is waiting to send video service data, the network device can first determine a frame interval of the video service data or a time interval when the video service data arrives at the UE. Then the network device determines a specified resource period of a semi-persistent resource for the video service data based on the frame interval of the video service data or the time interval when the video service data arrives at the UE. For example, as described below, the specified resource period can be configured to minimize a delay in transmitting the video service data, or to eliminate a delay caused by a mismatch between a configurable resource period specified in an existing communication protocol and a transmission characteristic of the video service data.

In one implementation, the specified resource period of the semi-persistent resource may be configured to be close to or equal to the frame interval or arrival interval of the video service data, thereby ensuring transmission quality of the video data transmission.

In some examples, the specified resource period may be different from the configurable resource periods specified in the existing communication protocols. For example, configurable resource periods for a CG resource can be: 2 OFDM symbols, 6 OFDM symbols, 7 OFDM symbols, 14 OFDM symbols, n times of 12 OFDM symbols, and n times of 14 OFDM symbols, where n is a positive integer; or configurable resource periods for an SPS resource can be: 10 ms, 20 ms, 32 ms, 40 ms, 64 ms, 80 ms, 128 ms, 160 ms, 320 ms and 640 ms.

In this embodiment, the type of indication message, the type of semi-persistent resource and the manner to determine the specified resource period can refer to the detailed descriptions of other embodiments of the present disclosure, which are not repeated here.

At step 802, data communication with the network device is performed based on the specified resource period.

The UE determines the specified resource period corresponding to the semi-persistent resource for the service data according to the indication message sent by the network device, and can use a corresponding semi-persistent resource according to the specified resource period of the configured semi-persistent resource after the semi-persistent resource is activated. For example, for an uplink CG resource, after RRC configuration, data is sent using the uplink resource according to the specified resource period configured by RRC. Or, for a downlink SPS resource, after RRC configuration and the resource is activated by PDCCH, data is received using the downlink resource according to the specified resource period configured by RRC.

It can be understood that, in the present disclosure, the indication message received by the UE is sent by the network device according to an arrival time interval of service data when it is determined that the arrival time interval of the service data is different from each default configurable resource period. Based on this, the indicated specified resource period matches the arrival time interval of the service data as much as possible to reduce the transmission delay of the service data.

In the method of determining the semi-persistent resource in the embodiments of the present disclosure, after acquiring the specified resource period of semi-persistent resource for service data determined by the network device according to the type of the first service data, the UE can perform data communication with the network device based on the specified resource period. Thereby reducing the communication delay of service data as much as possible and improving the quality and performance of service.

FIG. 9 is a schematic structural diagram of an apparatus for determining a semi-persistent resource 900 according to an embodiment of the present disclosure. The apparatus may be applied to a network device, as shown in FIG. 9, the apparatus 900 includes a sending module 901.

The sending module 901 is configured to send an indication message to a user equipment UE, where a specified resource period of a semi-persistent resource for service data included in the indication message is different from default configurable resource periods of the semi-persistent resource.

In some examples, the apparatus 900 further includes a processing module, not shown, that is configured to determine the specified resource period as a resource period for the semi-persistent resource.

In some examples, the processing module is further configured to determine a specified resource period corresponding to each subcarrier spacing SCS according to time domain resource allocation information corresponding to each SCS. The processing module is also configured to determine a specified resource period corresponding to each SCS according to a specified resource period corresponding to a specified SCS.

In some examples, the processing module is specifically configured to determine a number of symbols and/or a millisecond value included in the specified resource period corresponding to each SCS.

In some examples, the specified resource period includes a first period value, or a first period value plus a second period value, or a first period value plus a second period value and plus a third period value.

In some examples, the processing module is specifically configured to: determine that an arrival time interval of the service data is different from the default configurable resource periods, and determine the specified resource period according to the arrival time interval of the service data.

In some examples, time domain resource allocation information of each SCS includes: a duration per symbol, and the processing module can be specifically configured to determine a duration value corresponding to a default configurable resource period less than the arrival time interval of the service data as a millisecond value m corresponding to a first period value included in a specified resource period corresponding to each SCS, where m is a positive integer; determine a first difference between the arrival time interval of the service data and the m; and/or determine a number of symbols corresponding to a second period value included in the specified resource period corresponding to each SCS according to the duration per symbol corresponding to each SCS and the first difference.

In some examples, the processing module may be further specifically configured to determine a value obtained by rounding a quotient of the first difference and the duration per symbol corresponding to each SCS as the number of symbols corresponding to the second period value included in the specified resource period corresponding to each SCS;

and/or, for a SCS of a normal cyclic prefix, multiply a value obtained by rounding a quotient of the first difference and a duration per symbol corresponding to a specified SCS by a ratio of a number of slots per frame corresponding to each SCS to a number of slots per frame corresponding to the specified SCS, and determine an obtained product as the number of symbols corresponding to the second period value included in the specified resource period corresponding to each SCS.

In a possible implementation, time domain resource allocation information of each SCS includes: a duration per slot and a duration per symbol, and the processing module can be specifically configured to determine a millisecond value n corresponding to a first period value included in a specified resource period corresponding to each SCS according to a quotient S of the arrival time interval of the service data and a duration per slot corresponding to a specified SCS, where n is a positive integer; determine a second difference between the arrival time interval of the service data and the n; and/or determine a number of symbols corresponding to a second period value included in the specified resource period corresponding to each SCS according to the duration per symbol corresponding to each SCS and the second difference.

In some examples, the processing module may be further specifically configured to: determine an integer part of the S as the millisecond value n corresponding to the first period value included in the specified resource period corresponding to each SCS;

and/or, determine a maximum multiple value of a first specified value included within value range of S as the millisecond value n corresponding to the first period value included in the specified resource period corresponding to each SCS; and/or, determine a duration value corresponding to a default configurable resource period less than the S as the millisecond value n corresponding to the first period value included in the specified resource period corresponding to each SCS.

In a possible implementation, time domain resource allocation information of each SCS includes: a duration per slot and a duration per symbol, and the processing module can be further specifically configured to: determine a duration value corresponding to a default configurable resource period less than the arrival time interval of the service data as a millisecond value o corresponding to a first period value included in a specified resource period corresponding to each SCS, where o is a positive integer; determine a third difference between the arrival time interval of the service data and the o; determine a value obtained by rounding a quotient of the third difference and the duration per slot corresponding to each SCS as a millisecond value k corresponding to a second period value included in the specified resource period corresponding to each SCS, where k is a positive integer; determine a fourth difference between the third difference and the k; and/or determine a number of symbols corresponding to a third period value included in the specified resource period corresponding to each SCS according to the duration per symbol corresponding to each SCS and the fourth difference.

The processing module may be further specifically configured to: determine a value obtained by rounding a quotient of the fourth difference and the duration per symbol corresponding to each SCS as the number of symbols corresponding to the third period value included in the specified resource period corresponding to each SCS;

and/or, for a SCS of a normal cyclic prefix, multiply a value obtained by rounding a quotient of the fourth difference and a duration per symbol corresponding to a specified SCS by a ratio of a number of slots per frame corresponding to each SCS to a number of slots per frame corresponding to the specified SCS, and determine an obtained product as the number of symbols corresponding to the third period value included in the specified resource period corresponding to each SCS.

In a possible implementation, time domain resource allocation information of each SCS includes: a duration per slot and a duration per symbol, and the processing module can be further specifically configured to: determine a quotient S of the arrival time interval of the service data and the duration per slot corresponding to each SCS; determine a product between an integer part of the quotient S and a number of symbols per slot corresponding to each SCS as a number of symbols corresponding to a first period value included in a specified resource period corresponding to each SCS; and/or determine a number of symbols corresponding to a second period value included in the specified resource period corresponding to each SCS according to the duration per symbol corresponding to each SCS and a decimal part of the quotient S.

In some examples, the processing module may be further specifically configured to: determine a value obtained by rounding a quotient of the decimal part of the quotient S and the duration per symbol corresponding to each SCS as the number of symbols corresponding to the second period value included in the specified resource period corresponding to each SCS; and/or, multiply a value obtained by rounding a quotient of the decimal part of the quotient S and a duration per symbol corresponding to a specified SCS by a ratio of a number of slots per frame corresponding to each SCS to a number of slots per frame corresponding to the specified SCS, and determine an obtained product as the number of symbols corresponding to the second period value included in the specified resource period corresponding to each SCS.

In a possible implementation, time domain resource allocation information of each SCS includes: a duration per symbol, and the processing module can be further specifically configured to: determine a first number of symbols corresponding to a first period value and a second number of symbols corresponding to a second period value included in a specified resource period corresponding to a specified SCS; determine a value obtained by multiplying the first number of symbols by a ratio of a number of slots per frame corresponding to each SCS to a number of slots per frame corresponding to the specified SCS as a number of symbols corresponding to the first period value included in a specified resource period corresponding to each SCS; and/or determine a value obtained by multiplying the second number of symbols by the ratio of the number of slots per frame corresponding to each SCS to the number of slots per frame corresponding to the specified SCS as a number of symbols corresponding to the second period value included in the specified resource period corresponding to each SCS.

In a possible implementation, time domain resource allocation information of each SCS includes: a duration per symbol, and the processing module can be further specifically configured to: determine a value obtained by rounding a quotient of the arrival time interval of the service data and the duration per symbol corresponding to each SCS as a number of symbols included in a specified resource period corresponding to each SCS;

and/or, for a SCS of a normal cyclic prefix, multiply a value obtained by rounding a quotient of the arrival time interval of the service data and a duration per symbol corresponding to a specified SCS by a ratio of a number of slots per frame corresponding to each SCS to a number of slots per frame corresponding to the specified SCS, and determine an obtained product as a number of symbols included in the specified resource period corresponding to each SCS.

It should be noted that the above explanation of the embodiments of the method of determining the semi-persistent resources provided in FIGS. 1 to 8 is also applicable to the apparatus for determining the semi-persistent resource of the embodiment, and will not be repeated here.

According to the apparatus for determining the semi-persistent resource in the embodiment of the present disclosure, a network device, when determining that an arrival time interval of service data is different from the default configurable resource periods, may indicate to the UE a specified resource period that matches the arrival time interval of the service data to perform data communication with the UE based on the specified resource period. Thus, minimizing the communication delay of service data, and improving the quality and performance of service.

FIG. 10 is a schematic structural diagram of another apparatus for determining a semi-persistent resource 100 according to an embodiment of the present disclosure. The apparatus may be applied to a network device. As shown in FIG. 10, the apparatus for determining the semi-persistent resource 100 includes a processing module 110 and a sending module 120.

The processing module 110 is configured to determine a specified resource period of a semi-persistent resource for first service data based on a service type of the first service data.

The sending module 120 is configured to send indication message to a user equipment UE, where the indication message includes a specified resource period of the semi-persistent resource for the first service data.

In some examples, the specified resource period of the semi-persistent resource may be configured to be close to or equal to the frame interval or arrival interval of the video service data.

In some examples, the specified resource period may be different from the configurable resource periods specified in the existing communication protocols. For example, configurable resource periods for a CG resource can be: 2 OFDM symbols, 6 OFDM symbols, 7 OFDM symbols, 14 OFDM symbols, n times of 12 OFDM symbols, and n times of 14 OFDM symbols, where n is a positive integer; or configurable resource periods for an SPS resource can be: 10 ms, 20 ms, 32 ms, 40 ms, 64 ms, 80 ms, 128 ms, 160 ms, 320 ms and 640 ms.

It should be noted that the processing module 110 and the sending module 120 in the embodiment of the present disclosure can be configured to perform the steps in any embodiment of the present disclosure according to needs, so as to realize related functions, which are not repeated here.

In the apparatus of determining the semi-persistent resource in the embodiments of the present disclosure, the network device first determines, based on a type of service data, a specified resource period of a semi-persistent resource for the service data, and indicates the specified resource period to the UE to perform data transmission with the UE based on a resource period that matches the type of the service data to be processed. Therefore, minimizing the transmission delay of the service data, and improving the quality and performance of service.

Figure 11:
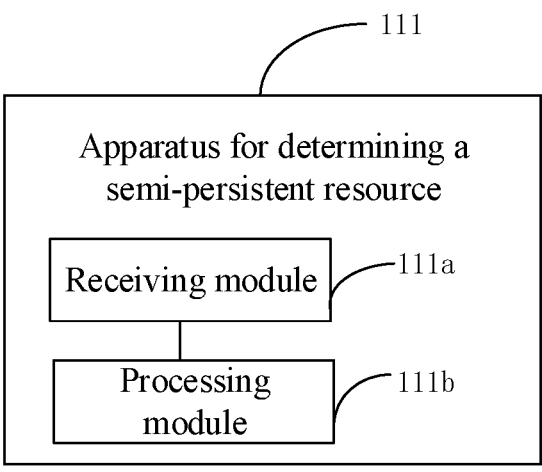
FIG. 11 is a schematic structural diagram of another apparatus for determining a semi-persistent resource according to an embodiment of the present disclosure.

FIG. 11 is a schematic structural diagram of another apparatus for determining a semi-persistent resource 111 according to an embodiment of the present disclosure. The apparatus may be applied to a user equipment. As shown in FIG. 11, the apparatus for determining the semi-persistent resource 111 includes a receiving module 111a and a processing module 111b.

The receiving module 111a is configured to receive an indication message sent by a network device, where a specified resource period of a semi-persistent resource for service data included in the indication message is different from default configurable resource periods of the semi-persistent resource.

The processing module 111b is configured to perform data communication with the network device based on the specified resource period.

In some examples, the indication message may include a number of symbols and/or a millisecond value included in a specified resource period corresponding to each subcarrier spacing SCS.

In some examples, the specified resource period includes a first period value, or a first period value plus a second period value.

In some examples, the specified resource period includes the first period value plus the second period value, and the first period value is a duration value corresponding to a default configurable resource period.

It should be noted that the above explanation of the embodiments of the method of determining the semi-persistent resources provided in FIGS. 1 to 8 is also applicable to the apparatus for determining the semi-persistent resource of the embodiment, and will not be repeated here.

In the apparatus for determining the semi-persistent resource in the embodiments of the present disclosure, the UE communicates with the network device through the specified resource period matched with the arrival time interval of the service data, thereby reducing the communication delay of the service data as much as possible and improving the quality and performance of the service.

Figure 12:
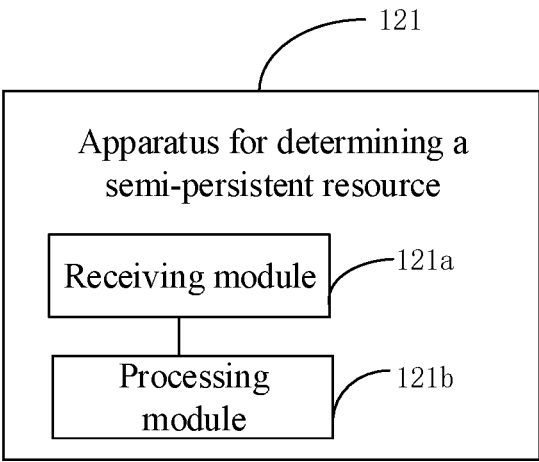
FIG. 12 is a schematic structural diagram of another apparatus for determining a semi-persistent resource according to an embodiment of the present disclosure.

FIG. 12 is a schematic structural diagram of another apparatus for determining a semi-persistent resource 121 according to an embodiment of the present disclosure. The apparatus may be applied to a user equipment. As shown in FIG. 12, the apparatus for determining the semi-persistent resource 121 includes a receiving module 121a and a processing module 121b.

The receiving module 121a is configured to receive an indication message sent by a network device, where a specified resource period of a semi-persistent resource for service data included in the indication message is determined by the network device based on a service type of first service data.

The processing module 121b is configured to perform data communication with the network device based on the specified resource period.

In some examples, the indication message may include a number of symbols and/or a millisecond value included in a specified resource period corresponding to each subcarrier spacing SCS.

In some examples, the specified resource period includes a first period value, or a first period value plus a second period value, or a first period value plus a second period value and plus a third period value.

In some examples, the specified resource period includes the first period value plus the second period value, and the first period value is a duration value corresponding to the default configurable resource period.

In one implementation, the specified resource period of the semi-persistent resource may be configured to be close to or equal to the frame interval or arrival interval of the video service data, thereby ensuring transmission quality of the video data transmission.

In some examples, the specified resource period may be different from the configurable resource periods specified in the existing communication protocols. For example, configurable resource periods for a CG resource can be: 2 OFDM symbols, 6 OFDM symbols, 7 OFDM symbols, 14 OFDM symbols, n times of 12 OFDM symbols, and n times of 14 OFDM symbols, where n is a positive integer; or configurable resource periods for an SPS resource can be: 10 ms, 20 ms, 32 ms, 40 ms, 64 ms, 80 ms, 128 ms, 160 ms, 320 ms and 640 ms.

It should be noted that the above explanation of the embodiments of the method of determining the semi-persistent resources provided in FIGS. 1 to 8 is also applicable to the apparatus for determining the semi-persistent resource of the embodiment, and will not be repeated here.

In the apparatus for determining the semi-persistent resource in the embodiments of the present disclosure, after acquiring the specified resource period of semi-persistent resource for service data determined by the network device according to the type of the first service data, the UE can perform data communication with the network device based on the specified resource period. Thereby reducing the communication delay of service data as much as possible and improving the quality and performance of service.

In the method of determining the semi-persistent resource provided by the embodiments of the present disclosure, the network device may send an indication message to a user equipment UE, where a specified resource period of a semi-persistent resource for service data included in the indication message is different from default configurable resource periods of the semi-persistent resource.

In a possible implementation, the network device may determine the specified resource period as a resource period for the semi-persistent resource.

In another possible implementation, the network device may determine a specified resource period corresponding to each subcarrier spacing SCS according to time domain resource allocation information corresponding to each SCS.

Additionally, or alternatively, the network device may determine a specified resource period corresponding to each SCS according to a specified resource period corresponding to a specified SCS.

In another possible implementation, the network device may determine a number of symbols and/or a millisecond value included in the specified resource period corresponding to each SCS.

In another possible implementation, the specified resource period includes a first period value, or a first period value plus a second period value.

In another possible implementation, the network device may determine that an arrival time interval of the service data is different from the default configurable resource periods, and determine the specified resource period according to the arrival time interval of the service data.

In a yet another possible implementation, time domain resource allocation information of each SCS includes: a duration per symbol the network device may determine a duration value corresponding to a default configurable resource period less than the arrival time interval of the service data as a millisecond value m corresponding to a first period value included in a specified resource period corresponding to each SCS, where m is a positive integer; determine a first difference between the arrival time interval of the service data and the m; and/or determine a number of symbols corresponding to a second period value included in the specified resource period corresponding to each SCS according to the duration per symbol corresponding to each SCS and the first difference.

In a yet another possible implementation, the network device can determine a value obtained by rounding a quotient of the first difference and the duration per symbol corresponding to each SCS as the number of symbols corresponding to the second period value included in the specified resource period corresponding to each SCS; and/or, the network device can multiply a value obtained by rounding a quotient of the first difference and a duration per symbol corresponding to a specified SCS by multiplying a ratio of a number of slots per frame corresponding to each SCS to a number of slots per frame corresponding to the specified SCS, and determine as the number of symbols corresponding to the second period value included in the specified resource period corresponding to each SCS.

In a yet another possible implementation, time domain resource allocation information of each SCS includes: a duration per slot and a duration per symbol, and the network device determine a millisecond value n corresponding to a first period value included in a specified resource period corresponding to each SCS according to a quotient S of the arrival time interval of the service data and a duration per slot corresponding to a specified SCS, where n is a positive integer; determine a second difference between the arrival time interval of the service data and the n; and then determine a number of symbols corresponding to a second period value included in the specified resource period corresponding to each SCS according to the duration per symbol corresponding to each SCS and the second difference.

In a yet another possible implementation, the network device may determine an integer part of the S as the millisecond value n corresponding to the first period value included in the specified resource period corresponding to each SCS; or, the network device may further determine a maximum multiple value of a first specified value included in the S as the millisecond value n corresponding to the first period value included in the specified resource period corresponding to each SCS; or, the network device may further determine a duration value corresponding to a default configurable resource period less than the S as the millisecond value n corresponding to the first period value included in the specified resource period corresponding to each SCS.

In a yet another possible implementation, time domain resource allocation information of each SCS includes: a duration per slot and a duration per symbol, and determining the specified resource period includes: determining a duration value corresponding to a default configurable resource period less than the arrival time interval of the service data as a millisecond value o corresponding to a first period value included in a specified resource period corresponding to each SCS, where o is a positive integer; determining a third difference between the arrival time interval of the service data and the o; determining a value obtained by rounding a quotient of the third difference and the duration per slot corresponding to each SCS as a millisecond value k corresponding to a second period value included in the specified resource period corresponding to each SCS, where k is a positive integer; determining a fourth difference between the third difference and the k; and determining a number of symbols corresponding to a third period value included in the specified resource period corresponding to each SCS according to the duration per symbol corresponding to each SCS and the fourth difference.

In a yet another possible implementation, according to the duration per symbol corresponding to each SCS and the fourth difference, the network device may determine a value obtained by rounding a quotient of the fourth difference and the duration per symbol corresponding to each SCS as the number of symbols corresponding to the third period value included in the specified resource period corresponding to each SCS; and/or, the network device may further multiply a value obtained by rounding a quotient of the fourth difference and a duration per symbol corresponding to a specified SCS by a ratio of a number of slots per frame corresponding to each SCS to a number of slots per frame corresponding to the specified SCS, and determine as the number of symbols corresponding to the third period value included in the specified resource period corresponding to each SCS.

In a yet another possible implementation, time domain resource allocation information of each SCS includes: a duration per slot and a duration per symbol, the network device may further determine a quotient S of the arrival time interval of the service data and the duration per slot corresponding to each SCS; and determine a product between an integer part of the quotient S and a number of symbols per slot corresponding to each SCS as a number of symbols corresponding to a first period value included in a specified resource period corresponding to each SCS; and then determine a number of symbols corresponding to a second period value included in the specified resource period corresponding to each SCS according to the duration per symbol corresponding to each SCS and a decimal part of the quotient S.

In a yet another possible implementation, the network device can determine a value obtained by rounding a quotient of the decimal part of the quotient S and the duration per symbol corresponding to each SCS as the number of symbols corresponding to the second period value included in the specified resource period corresponding to each SCS; and/or, the network device can further multiply a value obtained by rounding a quotient of the decimal part of the quotient S and a duration per symbol corresponding to a specified SCS by a ratio of a number of slots per frame corresponding to each SCS to a number of slots per frame corresponding to the specified SCS, and determine as the number of symbols corresponding to the second period value included in the specified resource period corresponding to each SCS.

In a yet another possible implementation, time domain resource allocation information of each SCS includes: a duration per symbol, the network device may first determine a first number of symbols corresponding to a first period value and a second number of symbols corresponding to a second period value included in a specified resource period corresponding to a specified SCS; and determine a value obtained by multiplying the first number of symbols by a ratio of a number of slots per frame corresponding to each SCS to a number of slots per frame corresponding to the specified SCS as a number of symbols corresponding to the first period value included in a specified resource period corresponding to each SCS; and then determine a value obtained by multiplying the second number of symbols by the ratio of the number of slots per frame corresponding to each SCS to the number of slots per frame corresponding to the specified SCS as a number of symbols corresponding to the second period value included in the specified resource period corresponding to each SCS.

In a yet another possible implementation, time domain resource allocation information of each SCS includes: a duration per symbol, the network device may determine a value obtained by rounding a quotient of the arrival time interval of the service data and the duration per symbol corresponding to each SCS as a number of symbols included in a specified resource period corresponding to each SCS; and/or, the network device may determine a value obtained by rounding a quotient of the arrival time interval of the service data and a duration per symbol corresponding to a specified SCS, and multiplying a ratio of a number of slots per frame corresponding to each SCS to a number of slots per frame corresponding to the specified SCS as a number of symbols included in the specified resource period corresponding to each SCS.

In addition, in the method of determining the semi-persistent resource provided by the embodiments of the present disclosure, the user equipment may first receive an indication message sent by a network device, where a specified resource period of a semi-persistent resource for service data included in the indication message is different from default configurable resource periods of the semi-persistent resource, and then perform data communication with the network device based on the specified resource period.

In a possible implementation, the indication message includes a number of symbols and/or a millisecond value included in a specified resource period corresponding to each subcarrier spacing SCS.

In another possible implementation, the specified resource period includes a first period value, or a first period value plus a second period value.

In a yet another possible implementation, the specified resource period includes the first period value plus the second period value, and the first period value is a duration value corresponding to a default configurable resource period.

In order to realize the above embodiments, the present disclosure further provides a communication device.

Figure 13:
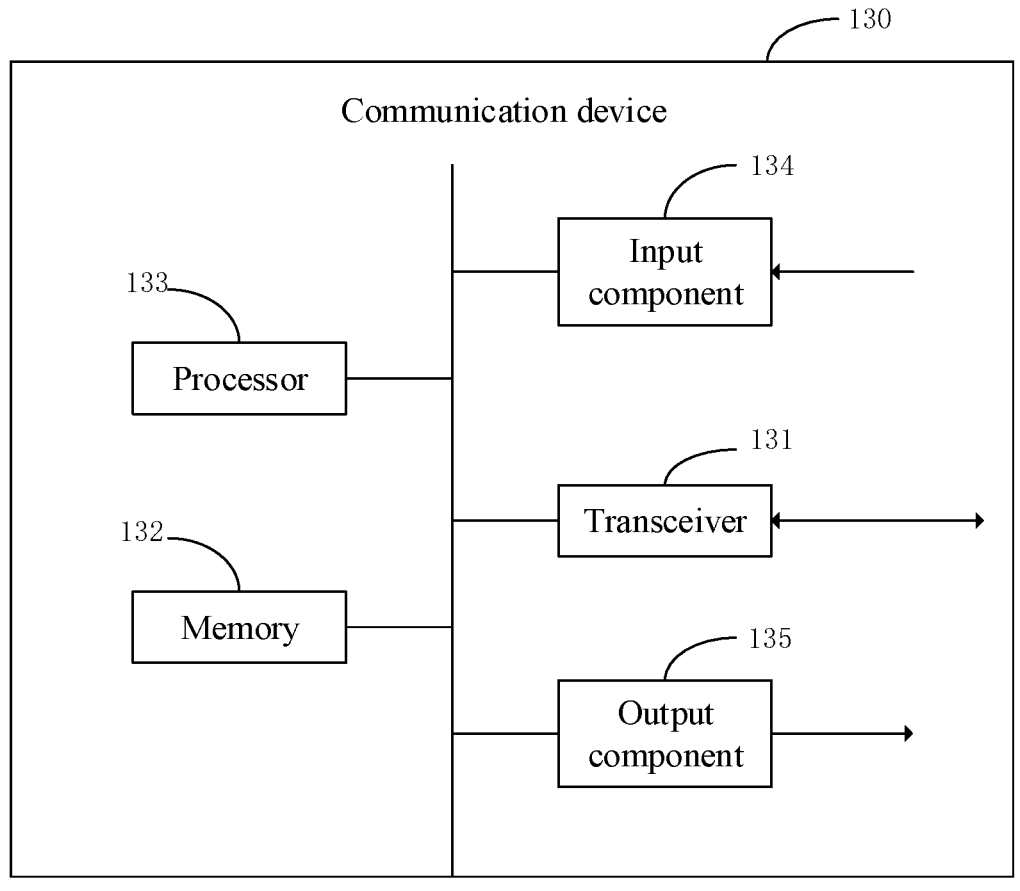
FIG. 13 is a schematic structural diagram of a communication device according to an embodiment of the present disclosure.

As shown in FIG. 13, embodiments of the present disclosure provide a communication device 130 including: a transceiver 131; a memory 132; and a processor 133, connected to the transceiver 131 and the memory 132 respectively, configured to control the transceiver 131 to transmit and receive wireless signals by executing computer-executable instructions on the memory 132, and can realize the method of determining the semi-persistent resource described in any of the above embodiments.

That is, the communication device 130 may be a UE as described previously, an AMF (Access and Mobility Management Function), or an AN (Access Network), and the present disclosure is not limited thereto.

The processor 133 may include various types of storage media, which are non-transitory computer storage media. The processor 133 may be connected to the memory 132 via a bus, etc., configured to read an executable program stored on the memory 132 to implement, for example, at least one method as shown in FIGS. 1 to 8.

In order to realize the above embodiments, the present disclosure further provides a non-transitory computer readable storage medium.

Embodiments of the present disclosure provide a non-transitory computer readable storage medium storing an executable program; the executable program, when executed by a processor, is capable of realizing the foregoing method, e.g., as at least one of FIGS. 1 to 8.

Communication devices in embodiments of the present disclosure are intended to represent various forms of digital computers, such as, laptops, desktop computers, workstations, personal digital assistants, servers, blade servers, mainframe computers, and other suitable computers. Communication devices may also denote various forms of mobile apparatus, such as, personal digital processing, cellular telephones, smart phones, wearable devices, and other similar computing apparatuses. The components shown herein, their connections and relationships, and their functions are only examples, and are not intended to limit the implementation of the present disclosure described and/or claimed herein.

The communication device 130 may include: one or more processors 133 (one processor 133 is used as an example in FIG. 13), a memory 132, and interfaces for connecting the components, including a high speed interface and a low speed interface. The components are connected to each other using different buses and can be mounted on a common motherboard or otherwise as required. The processor 133 may process instructions executed within the communication device, including instructions stored in or on memory to display graphical information of a GUI on an external input/output apparatus (e.g., a display device coupled to the interface). In other implementations, multiple processors and/or multiple buses may be used with multiple memories and multiple memories, if necessary. The memory 132 can be a non-transitory computer-readable storage medium provided by the present disclosure. The memory 132 stores instructions executable by at least one processor 133, so that the at least one processor executes the method of determining the semi-persistent resource provided by the present disclosure. The non-transitory computer-readable storage medium of the present disclosure stores computer instructions for causing a computer to execute the method of determining the semi-persistent resource provided by the present disclosure.

As a non-transitory computer-readable storage medium, the memory 132 can be used to store non-transitory software programs, non-transitory computer-executable programs and modules, such as program instructions/modules corresponding to the method of determining the semi-persistent resource in an embodiment of the present disclosure (e.g., the sending module 910 shown in FIG. 9 of the accompanying drawings or the receiving module 111*a* and the processing module 111*b* shown in FIG. 11 of the accompanying drawings, etc.). The processor 133 executes various functional applications of the server and data processing by running non-transitory software programs, instructions, and modules stored in the memory 132, i.e., realizing the method of determining the semi-persistent resource in the method embodiment described above.

The memory 132 may include a storage program area and a storage data area, where the storage program area may store an operating system and an application required by at least one function, the storage data area may store data created according to the use of positioning communication device and the like. In addition, the memory 132 may include high-speed random access memory and may further include non-transitory memory, such as at least one disk memory device, flash memory device, or other non-transitory solid-state memory devices. In some examples, the memory 132 may optionally include a memory remotely set relative to processor 133, which can be connected to the positioning communication device through a network. Examples of the above networks include, but are not limited to, an Internet, an enterprise intranet, a local area network, a mobile communication network, and combinations thereof.

The communication device may further include an input component 134 and an output component 135. The processor 133, the memory 132, the input component 134, and the output component 135 may be connected via a bus or otherwise, with the connection via a bus being used as an example in FIG. 13.

The input component 134 may receive input digital or character information and generate key signal input related to user settings and function control of the positioning communication device, such as touch screen, keypad, mouse, track pad, touch pad, pointing stick, one or more mouse buttons, trackball, joystick and other input apparatuses. The output component 135 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display, and a plasma display. In some implementations, the display device may be a touch screen.

Various implementations of the systems and techniques described herein may be realized in digital electronic circuit systems, integrated circuit systems, specialized ASICs (Application Specific Integrated Circuits), computer hardware, firmware, software, and/or combinations thereof. These various implementations may include being implemented in one or more computer programs that can be executed and/or interpreted on a programmable system including at least one programmable processor, which may be a special-purpose or general-purpose programmable processor and can receive data and instructions from a storage system, at least one input apparatus, and at least one output apparatus, and transmit data and instructions to the storage system, the at least one input apparatus, and the at least one output apparatus.

These computing programs (also called programs, software, software applications, or codes) include machine instructions for programmable processors and may be implemented using high-level procedural and/or object-oriented programming languages, and/or assembly/machine languages. As used herein, the terms "machine-readable medium" and "computer-readable medium" refer to any computer program product, device and/or apparatus (e.g., magnetic discs, optical disks, memory, programmable logic devices (PLD)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In order to provide interaction with users, the systems and techniques described herein can be implemented on a computer having a display apparatus (for example, a CRT (cathode ray tube) or an LCD (liquid crystal display) monitor) for displaying information to users; and a keyboard and a pointing apparatus (for example, a mouse or a trackball) by which the user can provide input to the computer. Other kinds of apparatuses can further be used to provide for interaction with a user. For example, a feedback provided to a user may be any form of sensory feedback (e.g., visual feedback, auditory feedback, or haptic feedback); and input from the user may be received in any form (including acoustic input, voice input, or, haptic input).

The system and techniques described herein can be implemented in a computing system that includes back-end components (e.g., serving as a data server), or in a computing system that includes middleware components (e.g., an application server), or in a computing system that includes front-end components (e.g., a user computer with a graphical user interface or web browser through which users can interact with the implementation of the system and technology described here), or in a computing system that includes any combination of such back-end components, middleware components, or front-end components. Components of the system can be interconnected by any form or medium of digital data communication (e.g., communication network). Examples of communication networks include local area network (LAN), wide area network (WAN) and Internet.

The computing system can include a client and a server. The client and server are generally far away from each other and usually interact through a communication network. The relationship between client and server is generated by computer programs running on corresponding computers and having a client-server relationship with each other.

It should be understood that steps can be reordered, added or deleted using the various forms of process shown above. For example, the steps described in the present disclosure can be executed in parallel, sequentially or in different orders, so long as the desired results of the technical solution disclosed in the present disclosure can be achieved, and are not limited herein.

The above specific embodiments do not constitute a limitation on the scope of protection of the present disclosure. Those skilled in the art should understand that various modifications, combinations, sub combinations and substitutions can be made to method steps, apparatuses or device units in the embodiments of methods, apparatuses and devices of the present disclosure according to design requirements and other factors. Any modification, equivalent substitution and improvement made within the spirit and principles of the present disclosure should be included in the protection scope of the present disclosure.

The invention claimed is:

1. A method of determining a semi-persistent resource, performed by a network device, comprising:

sending an indication message to a user equipment (UE), wherein the indication message comprises at least one of a number of symbols or a millisecond value comprised in a specified resource period corresponding to each subcarrier spacing (SCS) and the specified resource period comprises a first period value, or a first period value plus a second period value, or a first period value plus a second period value and plus a third period value, and wherein the specified resource period of the semi-persistent resource for service data comprised in the indication message is different from default configurable resource periods of the semi-persistent resource.

2. The method according to claim 1, further comprising:

determining the specified resource period as a resource period for the semi-persistent resource.

3. The method according to claim 1, further comprising:

determining the specified resource period corresponding to each of a plurality of subcarrier spacing (SCS) according to time domain resource allocation information corresponding to each of the plurality of SCS; or determining the specified resource period corresponding to each of a plurality of subcarrier spacing (SCS) according to a specified resource period corresponding to a specified SCS.

4. The method according to claim 3, wherein determining the specified resource period corresponding to each of the plurality of SCS comprises:

determining at least one of the number of symbols or the millisecond value comprised in the specified resource period corresponding to each of the plurality of SCS.

5. The method according to claim 1, further comprising:

determining that an arrival time interval of the service data is different from the default configurable resource periods, and determining the specified resource period according to the arrival time interval of the service data.

6. The method according to claim 5, wherein time domain resource allocation information of each of a plurality of subcarrier spacings (SCS) comprises: a duration per symbol, and determining the specified resource period comprises:

determining a duration value corresponding to a default configurable resource period less than the arrival time interval of the service data as a millisecond value m corresponding to a first period value comprised in a specified resource period corresponding to each of the plurality of SCS, wherein m is a positive integer;

determining a first difference between the arrival time interval of the service data and the millisecond value m; and determining a number of symbols corresponding to a second period value comprised in the specified resource period corresponding to each of the plurality of SCS according to the duration per symbol corresponding to each of the plurality of SCS and the first difference.

7. The method according to claim 6, wherein determining the number of symbols corresponding to the second period value comprised in the specified resource period corresponding to each of the plurality of SCS according to the duration per symbol corresponding to each of the plurality of SCS and the first difference comprises:

determining a value obtained by rounding a quotient of the first difference and the duration per symbol corresponding to each of the plurality of SCS as the number of symbols corresponding to the second period value comprised in the specified resource period corresponding to each of the plurality of SCS; or for a SCS of a normal cyclic prefix, multiplying a value obtained by rounding a quotient of the first difference and a duration per symbol corresponding to a specified SCS by a ratio of a number of slots per frame corresponding to each of the plurality of SCS to a number of slots per frame corresponding to the specified SCS, and determining an obtained product as the number of symbols corresponding to the second period value comprised in the specified resource period corresponding to each of the plurality of SCS.

8. The method according to claim 5, wherein time domain resource allocation information of each of a plurality of subcarrier spacings (SCS) comprises: a duration per slot and a duration per symbol, and determining the specified resource period comprises:

determining a millisecond value n corresponding to a first period value comprised in a specified resource period corresponding to each of the plurality of SCS according to a quotient S of the arrival time interval of the service data and a duration per slot corresponding to a specified SCS, wherein n is a positive integer;

determining a second difference between the arrival time interval of the service data and the millisecond value n; and determining a number of symbols corresponding to a second period value comprised in the specified resource period corresponding to each of the plurality of SCS according to the duration per symbol corresponding to each of the plurality of SCS and the second difference.

9. The method according to claim 8, wherein determining the millisecond value n corresponding to the first period value comprised in the specified resource period corresponding to each of the plurality of SCS according to the quotient S of the arrival time interval of the service data and the duration per slot corresponding to the specified SCS comprises at least one of:

determining an integer part of the quotient S as the millisecond value n corresponding to the first period value comprised in the specified resource period corresponding to each of the plurality of SCS;

determining a maximum multiple value of a first specified value comprised within a value range of the quotient S as the millisecond value n corresponding to the first period value comprised in the specified resource period corresponding to each of the plurality of SCS; or determining a duration value corresponding to a default configurable resource period less than the quotient S as the millisecond value n corresponding to the first period value comprised in the specified resource period corresponding to each of the plurality of SCS.

10. The method according to claim 5, wherein time domain resource allocation information of each of a plurality of subcarrier spacings (SCS) comprises: a duration per slot and a duration per symbol, and determining the specified resource period comprises:

determining a duration value corresponding to a default configurable resource period less than the arrival time interval of the service data as a millisecond value o corresponding to a first period value comprised in a specified resource period corresponding to each of the plurality of SCS, wherein o is a positive integer;

determining a third difference between the arrival time interval of the service data and the millisecond value o;

determining a value obtained by rounding a quotient of the third difference and the duration per slot corresponding to each of the plurality of SCS as a millisecond value k corresponding to a second period value comprised in the specified resource period corresponding to each of the plurality of SCS, wherein k is a positive integer;

determining a fourth difference between the third difference and the millisecond value k; and determining a number of symbols corresponding to a third period value comprised in the specified resource period corresponding to each of the plurality of SCS according to the duration per symbol corresponding to each SCS and the fourth difference.

11. The method according to claim 10, wherein determining the number of symbols corresponding to the third period value comprised in the specified resource period corresponding to each of the plurality of SCS according to the duration per symbol corresponding to each of the plurality of SCS and the fourth difference comprises:

determining a value obtained by rounding a quotient of the fourth difference and the duration per symbol corresponding to each of the plurality of SCS as the number of symbols corresponding to the third period value comprised in the specified resource period corresponding to each of the plurality of SCS; or for a SCS of a normal cyclic prefix, multiplying a value obtained by rounding a quotient of the fourth difference and a duration per symbol corresponding to a specified SCS by a ratio of a number of slots per frame corresponding to each of the plurality of SCS to a number of slots per frame corresponding to the specified SCS, and determining an obtained product as the number of symbols corresponding to the third period value comprised in the specified resource period corresponding to each of the plurality of SCS.

12. The method according to claim 5, wherein time domain resource allocation information of each of a plurality of subcarrier spacings (SCS) comprises: a duration per slot and a duration per symbol, and determining the specified resource period comprises:

determining a quotient S of the arrival time interval of the service data and the duration per slot corresponding to each of the plurality of SCS;

determining a product between an integer part of the quotient S and a number of symbols per slot corresponding to each of the plurality of SCS as a number of symbols corresponding to a first period value comprised in a specified resource period corresponding to each of the plurality of SCS; and determining a number of symbols corresponding to a second period value comprised in the specified resource period corresponding to each of the plurality of SCS according to the duration per symbol corresponding to each of the plurality of SCS and a decimal part of the quotient S.

13. The method according to claim 12, wherein determining the number of symbols corresponding to the second period value comprised in the specified resource period corresponding to each of the plurality of SCS according to the duration per symbol corresponding to each of the plurality of SCS and the decimal part of the quotient S comprises:

determining a value obtained by rounding a quotient of the decimal part of the quotient S and the duration per symbol corresponding to each of the plurality of SCS as the number of symbols corresponding to the second period value comprised in the specified resource period corresponding to each of the plurality of SCS.

14. The method according to claim 5, wherein time domain resource allocation information of each of a plurality of subcarrier spacings (SCS) comprises: a duration per symbol, and determining the specified resource period comprises:

determining a first number of symbols corresponding to a first period value and a second number of symbols corresponding to a second period value comprised in a specified resource period corresponding to a specified SCS;

determining a value obtained by multiplying the first number of symbols by a ratio of a number of slots per frame corresponding to each of the plurality of SCS to a number of slots per frame corresponding to the specified SCS as a number of symbols corresponding to the first period value comprised in a specified resource period corresponding to each of the plurality of SCS; and determining a value obtained by multiplying the second number of symbols by the ratio of the number of slots per frame corresponding to each of the plurality of SCS to the number of slots per frame corresponding to the specified SCS as a number of symbols corresponding to the second period value comprised in the specified resource period corresponding to each of the plurality of SCS.

15. The method according to claim 5, wherein time domain resource allocation information of each of a plurality of subcarrier spacings (SCS) comprises: a duration per symbol, and determining the specified resource period comprises:

determining a value obtained by rounding a quotient of the arrival time interval of the service data and the duration per symbol corresponding to each of the plurality of SCS as a number of symbols comprised in a specified resource period corresponding to each of the plurality of SCS; or for a SCS of a normal cyclic prefix, multiplying a value obtained by rounding a quotient of the arrival time interval of the service data and a duration per symbol corresponding to a specified SCS by a ratio of a number of slots per frame corresponding to each of the plurality of SCS to a number of slots per frame corresponding to the specified SCS, and determining an obtained product as a number of symbols comprised in the specified resource period corresponding to each of the plurality of SCS.

16. A method of determining a semi-persistent resource, performed by a user equipment, comprising:

receiving an indication message sent by a network device, wherein a specified resource period of the semi-persistent resource for service data comprised in the indication message is different from default configurable resource periods of the semi-persistent resource, wherein the indication message comprises at least one of a number of symbols or a millisecond value comprised in the specified resource period corresponding to each subcarrier spacing (SCS) and the specified resource period comprises a first period value, or a first period value plus a second period value, or a first period value plus a second period value and plus a third period value; and performing data communication with the network device based on the specified resource period.

17. The method according to claim 16, wherein in response to determining that the specified resource period comprises the first period value plus the second period value, the first period value is a duration value corresponding to a default configurable resource period.

18. A communication device, comprising:

a processor;

a transceiver; and a memory and a computer program stored on the memory, wherein the processor runs the computer program, and is configured to:

send an indication message to a user equipment (UE), wherein the indication message comprises at least one of a number of symbols or a millisecond value comprised in a specified resource period corresponding to each subcarrier spacing (SCS) and the specified resource period comprises a first period value, or a first period value plus a second period value, or a first period value plus a second period value and plus a third period value, and wherein the specified resource period of a semi-persistent resource for service data comprised in the indication message is different from default configurable resource periods of the semi-persistent resource.

\*   \*   \*   \*   \*